US012082606B2

(12) United States Patent
Blandino et al.

(10) Patent No.: US 12,082,606 B2
(45) Date of Patent: Sep. 10, 2024

(54) ARTICLE FOR USE WITH APPARATUS FOR HEATING SMOKABLE MATERIAL

(71) Applicant: NICOVENTURES TRADING LIMITED, London (GB)

(72) Inventors: Thomas P. Blandino, Cottage Grove, WI (US); Andrew P. Wilke, Madison, WI (US); James J. Frater, Madison, WI (US); Benjamin J. Paprocki, Cottage Grove, WI (US); Duane A. Kaufman, Hollandale, WI (US); Raymond J. Robey, Madison, WI (US); John Miller, Marshall, WI (US)

(73) Assignee: NICOVENTURES TRADING LIMITED, London (GB)

( * ) Notice: Subject to any disclaimer, the term of this patent is extended or adjusted under 35 U.S.C. 154(b) by 0 days.

(21) Appl. No.: 17/646,618

(22) Filed: Dec. 30, 2021

(65) Prior Publication Data

US 2022/0117294 A1 Apr. 21, 2022

Related U.S. Application Data

(63) Continuation of application No. 15/772,396, filed as application No. PCT/EP2016/075736 on Oct. 26,
(Continued)

(51) Int. Cl.
*A24D 1/20* (2020.01)
*A24B 15/16* (2020.01)
(Continued)

(52) U.S. Cl.
CPC .............. *A24D 1/20* (2020.01); *A24B 15/165* (2013.01); *A24F 40/42* (2020.01); *A24F 40/465* (2020.01);
(Continued)

(58) Field of Classification Search
None
See application file for complete search history.

(56) References Cited

U.S. PATENT DOCUMENTS 2,592,554 A 4/1952 Frankenburg
2,860,638 A 11/1958 Frank et al.
(Continued)

FOREIGN PATENT DOCUMENTS

AU 2014369867 A1 6/2016
AU 2017289114 B2 4/2020
(Continued)

OTHER PUBLICATIONS

Communication pursuant to Article 94(3) EPC for Application No. 16798648.8, dated Nov. 19, 2020, 9 pages.
(Continued)

*Primary Examiner* — Thor S Campbell
(74) *Attorney, Agent, or Firm* — WOMBLE BOND DICKINSON (US) LLP

(57) ABSTRACT

Disclosed is an article for use with apparatus for heating smokable material to volatilize at least one component of the smokable material. The article includes a mass of smokable material. An exterior of the article has a length (L), a width (W) perpendicular to the length (L), and a depth (D) perpendicular to each of the length (L) and the width (W). The length (L) is greater than or equal to the width (W), and the width (W) is greater than the depth (D).

3 Claims, 3 Drawing Sheets

Related U.S. Application Data 2016, now Pat. No. 11,252,992, which is a continuation of application No. 14/927,551, filed on Oct. 30, 2015, now abandoned.

(51) Int. Cl.

| | |
|---|---|
| ***A24F 40/20*** | (2020.01) |
| ***A24F 40/42*** | (2020.01) |
| ***A24F 40/465*** | (2020.01) |
| ***H05B 3/00*** | (2006.01) |
| ***H05B 3/34*** | (2006.01) |

(52) U.S. Cl.
CPC ............. *H05B 3/0014* (2013.01); *H05B 3/34* (2013.01); *A24F 40/20* (2020.01)

(56) References Cited

U.S. PATENT DOCUMENTS

| | | | |
|---|---|---|---|
| 3,065,756 | A | 11/1962 | Noel et al. |
| 3,144,174 | A | 8/1964 | Henry et al. |
| 3,173,612 | A | 3/1965 | Gut et al. |
| 3,517,151 | A | 6/1970 | Mekjean et al. |
| 3,596,034 | A | 7/1971 | Mekjean |
| 4,149,548 | A | 4/1979 | Bradshaw |
| 4,913,168 | A | 4/1990 | Potter et al. |
| 4,944,317 | A | 7/1990 | Thal |
| 5,093,894 | A | 3/1992 | Deevi et al. |
| 5,144,962 | A | 9/1992 | Counts et al. |
| 5,317,132 | A | 5/1994 | Clough et al. |
| 5,369,249 | A | 11/1994 | Kwon |
| 5,613,505 | A | 3/1997 | Campbell et al. |
| 5,649,554 | A | 7/1997 | Sprinkel et al. |
| 6,053,176 | A | 4/2000 | Adams et al. |
| 6,164,287 | A | 12/2000 | White |
| 6,632,407 | B1 | 10/2003 | Lau et al. |
| 6,803,550 | B2 | 10/2004 | Sharpe et al. |
| 7,185,659 | B2 | 3/2007 | Sharpe |
| 7,185,959 | B2 | 3/2007 | Mueller et al. |
| 7,810,505 | B2 | 10/2010 | Yang |
| 8,459,271 | B2 | 6/2013 | Inagaki |
| 8,807,140 | B1 | 8/2014 | Scatterday |
| 8,910,640 | B2 | 12/2014 | Sears et al. |
| 9,357,803 | B2 | 6/2016 | Egoyants et al. |
| 9,554,598 | B2 | 1/2017 | Egoyants et al. |
| 9,980,512 | B2 | 5/2018 | Collett et al. |
| 10,420,372 | B2 | 9/2019 | Suzuki et al. |
| 10,524,508 | B2 | 1/2020 | Sur et al. |
| 11,937,642 | B2 | 3/2024 | Mironov et al. |
| 2002/0005207 | A1 | 1/2002 | Wrenn et al. |
| 2002/0078951 | A1 | 6/2002 | Nichols et al. |
| 2002/0078956 | A1 | 6/2002 | Sharpe et al. |
| 2003/0007887 | A1 | 1/2003 | Roumpos et al. |
| 2003/0102304 | A1 | 6/2003 | Boyers |
| 2003/0230567 | A1 | 12/2003 | Centanni et al. |
| 2004/0149297 | A1 | 8/2004 | Sharpe |
| 2005/0025213 | A1 | 2/2005 | Parks |
| 2005/0045193 | A1 | 3/2005 | Yang |
| 2007/0267409 | A1 | 11/2007 | Gard et al. |
| 2009/0120928 | A1 | 5/2009 | Lee et al. |
| 2009/0151717 | A1 | 6/2009 | Bowen et al. |
| 2009/0250530 | A1 | 10/2009 | Stambaugh et al. |
| 2009/0293888 | A1 | 12/2009 | Williams et al. |
| 2010/0024834 | A1 | 2/2010 | Oglesby et al. |
| 2010/0181387 | A1 | 7/2010 | Zaffaroni et al. |
| 2011/0240022 | A1 | 10/2011 | Hodges et al. |
| 2011/0271971 | A1 | 11/2011 | Conner et al. |
| 2012/0145703 | A1 | 6/2012 | Matsen et al. |
| 2012/0214926 | A1 | 8/2012 | Berthold et al. |
| 2012/0234315 | A1 | 9/2012 | Li et al. |
| 2012/0305545 | A1 | 12/2012 | Brosnan et al. |
| 2013/0030125 | A1 | 1/2013 | Buryak et al. |
| 2013/0133675 | A1 | 5/2013 | Shinozaki et al. |
| 2013/0160780 | A1 | 6/2013 | Matsumoto et al. |
| 2013/0255702 | A1 | 10/2013 | Griffith, Jr. et al. |
| 2014/0060554 | A1 | 3/2014 | Collett et al. |
| 2014/0158144 | A1 | 6/2014 | Kaljura et al. |
| 2014/0216485 | A1 | 8/2014 | Egoyants et al. |
| 2014/0301721 | A1 | 10/2014 | Ruscio et al. |
| 2014/0345606 | A1 | 11/2014 | Talon |
| 2015/0040925 | A1 | 2/2015 | Saleem et al. |
| 2015/0181937 | A1 | 7/2015 | Dubief et al. |
| 2015/0201670 | A1 | 7/2015 | Crooks et al. |
| 2015/0201675 | A1 | 7/2015 | Lord |
| 2015/0237913 | A1 | 8/2015 | Suzuki et al. |
| 2015/0245669 | A1 | 9/2015 | Cadieux et al. |
| 2015/0272219 | A1 | 10/2015 | Hatrick et al. |
| 2015/0335062 | A1 | 11/2015 | Shinkawa et al. |
| 2016/0007652 | A1 | 1/2016 | Taluskie et al. |
| 2016/0120221 | A1 | 5/2016 | Mironov et al. |
| 2016/0150825 | A1 | 6/2016 | Mironov et al. |
| 2016/0192708 | A1 | 7/2016 | DeMeritt et al. |
| 2016/0324215 | A1 | 11/2016 | Mironov et al. |
| 2016/0331031 | A1 | 11/2016 | Malgat et al. |
| 2017/0055574 | A1 | 3/2017 | Kaufman et al. |
| 2017/0055575 | A1 | 3/2017 | Wilke et al. |
| 2017/0055580 | A1 | 3/2017 | Blandino et al. |
| 2017/0055581 | A1 | 3/2017 | Wilke et al. |
| 2017/0055582 | A1 | 3/2017 | Blandino et al. |
| 2017/0055583 | A1 | 3/2017 | Blandino et al. |
| 2017/0055584 | A1 | 3/2017 | Blandino et al. |
| 2017/0055585 | A1 | 3/2017 | Fursa et al. |
| 2017/0071250 | A1 | 3/2017 | Mironov et al. |
| 2017/0095006 | A1 | 4/2017 | Egoyants et al. |
| 2017/0119046 | A1 | 5/2017 | Kaufman et al. |
| 2017/0119047 | A1 | 5/2017 | Blandino et al. |
| 2017/0119048 | A1 | 5/2017 | Kaufman et al. |
| 2017/0119049 | A1 | 5/2017 | Blandino et al. |
| 2017/0119050 | A1 | 5/2017 | Blandino et al. |
| 2017/0119051 | A1 | 5/2017 | Blandino et al. |
| 2017/0156403 | A1 | 6/2017 | Gill et al. |
| 2017/0174418 | A1 | 6/2017 | Cai |
| 2017/0199048 | A1 | 7/2017 | Igumnov et al. |
| 2017/0224015 | A1 | 8/2017 | Basil et al. |
| 2017/0251718 | A1 | 9/2017 | Armoush et al. |
| 2017/0325506 | A1 | 11/2017 | Batista |
| 2018/0228217 | A1 | 8/2018 | Mironov et al. |
| 2018/0235279 | A1 | 8/2018 | Wilke et al. |
| 2018/0242633 | A1 | 8/2018 | Wilke et al. |
| 2018/0242636 | A1 | 8/2018 | Blandino et al. |
| 2018/0279677 | A1 | 10/2018 | Blandino et al. |
| 2018/0317552 | A1 | 11/2018 | Kaufman et al. |
| 2018/0317553 | A1 | 11/2018 | Blandino et al. |
| 2018/0360123 | A1 | 12/2018 | Silvestrini |
| 2019/0159517 | A1 | 5/2019 | Ballesteros Gomez et al. |
| 2019/0191780 | A1 | 6/2019 | Wilke et al. |
| 2019/0230988 | A1 | 8/2019 | Aoun |
| 2019/0239555 | A1 | 8/2019 | Nicholson |
| 2020/0054068 | A1 | 2/2020 | Blandino et al. |
| 2020/0054069 | A1 | 2/2020 | Blandino et al. |
| 2020/0229497 | A1 | 7/2020 | Aoun et al. |
| 2020/0268053 | A1 | 8/2020 | Thorsen et al. |
| 2020/0288774 | A1 | 9/2020 | Blandino et al. |
| 2021/0100281 | A1 | 4/2021 | Abi Aoun et al. |
| 2022/0015408 | A1 | 1/2022 | Blandino et al. |

FOREIGN PATENT DOCUMENTS

| | | | |
|---|---|---|---|
| CA | 2003521 | A1 | 5/1990 |
| CA | 2003522 | A1 | 5/1990 |
| CA | 2937722 | A1 | 11/2015 |
| CA | 2974770 | A1 | 12/2015 |
| CA | 2982164 | A1 | 10/2016 |
| CN | 1126426 | A | 7/1996 |
| CN | 2393205 | Y | 8/2000 |
| CN | 2738167 | Y | 11/2005 |
| CN | 2924411 | Y | 7/2007 |
| CN | 101084801 | A | 12/2007 |
| CN | 201076006 | Y | 6/2008 |
| CN | 201088138 | Y | 7/2008 |
| CN | 101277623 | A | 10/2008 |
| CN | 101326138 | A | 12/2008 |
| CN | 101390659 | A | 3/2009 |
| CN | 201199922 | Y | 3/2009 |

(56) References Cited

FOREIGN PATENT DOCUMENTS

| | | | |
|---|---|---|---|
| CN | 101951796 | A | 1/2011 |
| CN | 201762288 | U | 3/2011 |
| CN | 101326138 | B | 1/2013 |
| CN | 103202540 | A | 7/2013 |
| CN | 203369386 | U | 1/2014 |
| CN | 203435685 | U | 2/2014 |
| CN | 103689812 | A | 4/2014 |
| CN | 203735483 | U | 7/2014 |
| CN | 103960783 | A | 8/2014 |
| CN | 103988576 | A | 8/2014 |
| CN | 203748687 | U | 8/2014 |
| CN | 203762288 | U | 8/2014 |
| CN | 104013109 | A | 9/2014 |
| CN | 104095291 | A | 10/2014 |
| CN | 104256899 | A | 1/2015 |
| CN | 204091003 | U | 1/2015 |
| CN | 104365175 | A | 2/2015 |
| CN | 104470387 | A | 3/2015 |
| CN | 104480800 | A | 4/2015 |
| CN | 104619202 | A | 5/2015 |
| CN | 104664608 | A | 6/2015 |
| CN | 104768407 | A | 7/2015 |
| CN | 204519366 | U | 8/2015 |
| CN | 204539505 | U | 8/2015 |
| CN | 204599333 | U | 9/2015 |
| CN | 104994757 | A | 10/2015 |
| CN | 105188425 | A | 12/2015 |
| CN | 105682488 | A | 6/2016 |
| CN | 104095291 | B | 1/2017 |
| EA | 009116 | B1 | 10/2007 |
| EP | 0430559 | A2 | 6/1991 |
| EP | 0430566 | A2 | 6/1991 |
| EP | 0488488 | A1 | 6/1992 |
| EP | 0562474 | A2 | 9/1993 |
| EP | 0703735 | A1 | 4/1996 |
| EP | 0703735 | B1 | 7/2001 |
| EP | 1357025 | A2 | 10/2003 |
| EP | 1454840 | A1 | 9/2004 |
| EP | 1454840 | B1 | 9/2006 |
| EP | 1940254 | A2 | 7/2008 |
| EP | 2059091 | A2 | 5/2009 |
| EP | 1357025 | B1 | 7/2009 |
| EP | 2186833 | A1 | 5/2010 |
| EP | 2316286 | A1 | 5/2011 |
| EP | 2327318 | A1 | 6/2011 |
| EP | 2444112 | A1 | 4/2012 |
| EP | 2253541 | B1 | 5/2012 |
| EP | 2460424 | A1 | 6/2012 |
| EP | 2907397 | A1 | 8/2015 |
| EP | 3367823 | A2 | 9/2018 |
| EP | 3632244 | A1 | 4/2020 |
| GB | 347650 | A | 4/1931 |
| GB | 2495923 | A | 5/2013 |
| GB | 2504732 | A | 2/2014 |
| GB | 2504733 | A | 2/2014 |
| JP | S457120 | Y1 | 4/1970 |
| JP | H03113366 | A | 5/1991 |
| JP | H0556298 | U | 7/1993 |
| JP | H07502188 | A | 3/1995 |
| JP | H0850422 | A | 2/1996 |
| JP | H0851175 | A | 2/1996 |
| JP | H08511175 | A | 11/1996 |
| JP | 2001174054 | A | 6/2001 |
| JP | 2002144451 | A | 5/2002 |
| JP | 2004121594 | A | 4/2004 |
| JP | 3588469 | B2 | 11/2004 |
| JP | 2004331191 | A | 11/2004 |
| JP | 2008050422 | A | 3/2008 |
| JP | 2008511175 | A | 4/2008 |
| JP | 2009087703 | A | 4/2009 |
| JP | 2010022754 | A | 2/2010 |
| JP | 2010050834 | A | 3/2010 |
| JP | 2010508034 | A | 3/2010 |
| JP | 2013013441 | A | 1/2013 |
| JP | 2013515465 | A | 5/2013 |
| JP | 2015524261 | A | 8/2015 |
| JP | 2015531601 | A | 11/2015 |
| JP | 2016508744 | A | 3/2016 |
| JP | 2016516402 | A | 6/2016 |
| JP | 2016538842 | A | 12/2016 |
| JP | 6077145 | B2 | 2/2017 |
| JP | 2017515490 | A | 6/2017 |
| JP | 6875044 | B2 | 5/2021 |
| JP | 6933323 | B2 | 9/2021 |
| KR | 880701636 | A | 11/1988 |
| KR | 100385395 | B1 | 8/2003 |
| KR | 100449444 | B1 | 8/2005 |
| KR | 20100108565 | A | 10/2010 |
| KR | 20130029697 | A | 3/2013 |
| KR | 20150027069 | A | 3/2015 |
| KR | 20150040012 | A | 4/2015 |
| KR | 20150047616 | A | 5/2015 |
| KR | 20150132112 | A | 11/2015 |
| KR | 20150143877 | A | 12/2015 |
| KR | 20160064159 | A | 6/2016 |
| KR | 20170008209 | A | 1/2017 |
| RU | 2132629 | C1 | 7/1999 |
| RU | 2135054 | C1 | 8/1999 |
| RU | 103281 | U1 | 4/2011 |
| RU | 2425608 | C2 | 8/2011 |
| RU | 2509516 | C2 | 3/2014 |
| RU | 2531890 | C2 | 10/2014 |
| RU | 2015106592 | A | 11/2016 |
| UA | 125609 | C2 | 5/2022 |
| WO | WO-8404698 | A1 | 12/1984 |
| WO | WO-9409842 | A1 | 5/1994 |
| WO | WO-9527411 | A1 | 10/1995 |
| WO | WO-9527412 | A1 | 10/1995 |
| WO | WO-9618662 | A1 | 6/1996 |
| WO | WO-02089532 | A1 | 11/2002 |
| WO | WO-02098389 | A1 | 12/2002 |
| WO | WO-2007051163 | A2 | 5/2007 |
| WO | 2008015441 | A1 | 2/2008 |
| WO | WO-2009079641 | A2 | 6/2009 |
| WO | 2010113702 | A1 | 10/2010 |
| WO | 2010133342 | A1 | 11/2010 |
| WO | WO-2011130414 | A1 | 10/2011 |
| WO | WO-2012134117 | A2 | 10/2012 |
| WO | WO-2012164009 | A2 | 12/2012 |
| WO | WO-2013034459 | A1 | 3/2013 |
| WO | 2013098405 | A1 | 7/2013 |
| WO | WO-2013098395 | A1 | 7/2013 |
| WO | WO-2013098409 | A1 | 7/2013 |
| WO | 2013131763 | A1 | 9/2013 |
| WO | WO-2013131764 | A1 | 9/2013 |
| WO | WO-2013144324 | A1 | 10/2013 |
| WO | WO-2013178766 | A1 | 12/2013 |
| WO | WO-2014023965 | A1 | 2/2014 |
| WO | WO-2014023967 | A1 | 2/2014 |
| WO | WO-2014048745 | A1 | 4/2014 |
| WO | WO-2014054035 | A1 | 4/2014 |
| WO | WO-2014061477 | A1 | 4/2014 |
| WO | WO-2014102092 | A1 | 7/2014 |
| WO | WO-2014104078 | A1 | 7/2014 |
| WO | WO-2014139611 | A1 | 9/2014 |
| WO | WO-2014140320 | A1 | 9/2014 |
| WO | WO-2015019101 | A1 | 2/2015 |
| WO | WO-2015062983 | A2 | 5/2015 |
| WO | WO-2015071682 | A1 | 5/2015 |
| WO | WO-2015082648 | A1 | 6/2015 |
| WO | WO-2015082649 | A1 | 6/2015 |
| WO | WO-2015082651 | A1 | 6/2015 |
| WO | WO-2015082652 | A1 | 6/2015 |
| WO | WO-2015082653 | A1 | 6/2015 |
| WO | WO-2015100361 | A1 | 7/2015 |
| WO | WO-2015101479 | A1 | 7/2015 |
| WO | WO-2015116934 | A1 | 8/2015 |
| WO | WO-2015117702 | A1 | 8/2015 |
| WO | WO-2015131058 | A1 | 9/2015 |
| WO | WO-2015155289 | A1 | 10/2015 |
| WO | WO-2015166245 | A2 | 11/2015 |
| WO | WO-2015175568 | A1 | 11/2015 |
| WO | WO-2015176898 | A1 | 11/2015 |
| WO | WO-2015177043 | A1 | 11/2015 |

(56) References Cited

FOREIGN PATENT DOCUMENTS

| | | | |
|---|---|---|---|
| WO | WO-2015177044 | A1 | 11/2015 |
| WO | WO-2015177045 | A1 | 11/2015 |
| WO | WO-2015177046 | A1 | 11/2015 |
| WO | WO-2015177247 | A1 | 11/2015 |
| WO | WO-2015177253 | A1 | 11/2015 |
| WO | WO-2015177255 | A1 | 11/2015 |
| WO | WO-2015177257 | A1 | 11/2015 |
| WO | WO-2015177264 | A1 | 11/2015 |
| WO | WO-2015177294 | A1 | 11/2015 |
| WO | WO-2015198015 | A1 | 12/2015 |
| WO | WO-2016023965 | A1 | 2/2016 |
| WO | WO-2016075426 | A1 | 5/2016 |
| WO | WO-2016075436 | A1 | 5/2016 |
| WO | WO-2016096865 | A2 | 6/2016 |
| WO | WO-2016162446 | A1 | 10/2016 |
| WO | WO-2016207407 | A1 | 12/2016 |
| WO | WO-2017005705 | A1 | 1/2017 |
| WO | WO-2017029269 | A1 | 2/2017 |
| WO | WO-2017036950 | A2 | 3/2017 |
| WO | WO-2017036951 | A1 | 3/2017 |
| WO | WO-2017036954 | A1 | 3/2017 |
| WO | WO-2017036955 | A2 | 3/2017 |
| WO | WO-2017036957 | A1 | 3/2017 |
| WO | WO-2017036958 | A2 | 3/2017 |
| WO | WO-2017036959 | A1 | 3/2017 |
| WO | WO-2017036958 | A3 | 4/2017 |
| WO | WO-2017068098 | A1 | 4/2017 |
| WO | 2017072145 | A1 | 5/2017 |
| WO | 2017072146 | A1 | 5/2017 |
| WO | WO-2017072147 | A2 | 5/2017 |
| WO | WO-2017072148 | A1 | 5/2017 |
| WO | WO-2017072147 | A3 | 7/2017 |
| WO | WO-2017167932 | A1 | 10/2017 |

OTHER PUBLICATIONS

Communication pursuant to Article 94(3) EPC for Application No. 16798649.6, dated Jul. 5, 2021, 7 pages.
English Translation of Chinese Office Action, Application No. 2016800490915, dated Aug. 14, 2020, 8 pages.
European Search Report for European Application No. 20205063.9, dated Feb. 18, 2021. 13 pages.
Examination Report for Australian Application No. 2016313708, dated Nov. 1, 2019, 7 pages.
Examination Report for Australian Application No. 2016313708, dated Nov. 23, 2018, 6 pages.
Examination Report dated Sep. 6, 2019 for Australian Application No. 2017289114, 7 pages.
Examination Report No. 1 for Australian Patent Application No. 2018334042 dated Dec. 16, 2020, 4 pages.
Extended European Search Report for Application No. 20202666.2, dated Feb. 19, 2021, 14 pages.
Extended European Search Report for Application No. 20204770.0, dated Jun. 30, 2021, 14 pages.
Extended European Search Report for Application No. 20205060.5, dated Mar. 2, 2021, 19 pages.
Extended European Search Report for Application No. 20205065.4, dated Mar. 10, 2021, 14 pages.
Extended European Search Report for Application No. EP20205306.2, dated Feb. 19, 2021, 12 pages.
First Office Action and Search Report dated Mar. 4, 2020 for Chinese Application No. 201680077608.1 filed Oct. 26, 2016, 18 pages. .
International Preliminary Report on Patentability for Application No. PCT/EP2016/075735, dated Jan. 2, 2018, 8 pages.
International Preliminary Report on Patentability for Application No. PCT/EP2016/075737, dated May 11, 2018, 10 pages.
International Preliminary Report on Patentability for Application No. PCT/EP2016/075738, dated May 11, 2018, 9 pages.
International Preliminary Report on Patentability for Application No. PCT/EP2017/065906, dated Jan. 10, 2019, 9 pages.
International Preliminary Report on Patentability for Application No. PCT/EP2017/065908, dated Jan. 10, 2019, 9 pages.
International Preliminary Report on Patentability for Application No. PCT/EP2018/075093, dated Mar. 26, 2020, 8 pages.
International Preliminary Report on Patentability for Application No. PCT/EP2016/070190, dated Mar. 15, 2018, 12 pages.
International Preliminary Report on Patentability for Application No. PCT/EP2016/075736, dated May 11, 2018, 6 pages.
International Preliminary Report on Patentability for Application No. PCT/EP2017/065909,dated Jan. 10, 2019, 7 pages.
International Search Report and Written Opinion for Application No. PCT/EP2016/070190, dated Mar. 13, 2017, 19 pages.
International Search Report and Written Opinion for Application No. PCT/EP2016/075735, dated Feb. 2, 2017, 10 pages.
International Search Report and Written Opinion for Application No. PCT/EP2016/075736, dated Feb. 14, 2017, 6 pages.
International Search Report and Written Opinion for Application No. PCT/EP2016/075737, dated Jun. 16, 2017, 14 pages.
International Search Report and Written Opinion for Application No. PCT/EP2016/075738, dated Mar. 2, 2017, 12 pages.
International Search Report and Written Opinion for Application No. PCT/EP2017/065906, dated Oct. 24, 2017, 16 pages.
International Search Report and Written Opinion for Application No. PCT/EP2017/065908, dated Oct. 17, 2017, 11 pages.
International Search Report and Written Opinion for Application No. PCT/EP2017/065909, dated Oct. 24, 2017, 10 pages.
International Search Report and Written Opinion for Application No. PCT/EP2018/058195, dated Nov. 12, 2018, 20 pages.
International Search Report and Written Opinion for Application No. PCT/EP2018/075093, dated Jan. 4, 2019, 11 pages.
International Search Report for Application No. PCT/EP2018/083795, dated Mar. 15, 2019, 3 pages.
Iorga A., et al., "Low Curie Temperature in Fe—Cr—Ni—Mn Alloys," U.P.B. Sci.Bull., Series B, vol. 73 (4), 2011, pp. 195-202.
Neomax Materials Co., Ltd., "NeoMax MS-135," retrieved from http://www.neomax-materials.co.jp/eng/pr0510.htm, as accessed on Oct. 30, 2015, 2 pages.
Notice of Opposition dated Jun. 3, 2020 for European Application No. 16766494.5, 37 pages.
Notice of Reasons For Refusal Office Action dated Sep. 8, 2020 for Japanese Application No. 2018-567856, 8 pages.
Notice of Reasons For Rejection Office Action dated Mar. 17, 2020 for Japanese Application No. 2018-522061, 7 pages.
Office Action and Search Report dated Apr. 14, 2020 for Chinese Application No. 201680063711.0, 28 pages.
Office Action dated Jun. 1, 2021, for Russian Application No. 2020135859, 12 pages.
Office Action dated Jun. 17, 2021 for Ukraine Application No. 201804590, 3 pages.
Office Action dated Jun. 25, 2019 for Japanese Application No. 2018-521546, 4 pages.
Office Action For Canadian Application No. 3,003,519, dated Jul. 30, 2021, 4 pages.
Office Action For Canadian Application No. 3,056,677, dated Nov. 24, 2020, 6 pages.
Office Action For Chinese Application No. 201680072882. X, dated Sep. 1, 2021, 17 pages.
Office Action For Chinese Application No. 201680072882.X, dated Jan. 14, 2021, 12 pages.
Office Action for Chinese Application No. 201780039879.2 dated Sep. 18, 2020, 7 pages.
Office Action For Japanese Application No. 2020-093539, dated Apr. 6, 2021, 6 pages.
Office Action For Japanese Application No. 2020-191836, dated Oct. 26, 2021, 8 pages.
Office Action For Japanese Application No. 2020-191838, dated Oct. 26, 2021, 8 pages.
Office Action For Korean Application No. 10-2018-7037677, dated Mar. 29, 2021, 6 pages.
Office Action For Russian Application No. 2020135808, dated Apr. 23, 2021, 12 pages.
Office Action dated Mar. 1, 2019 for Canadian Application No. 2996341, 4 pages.

(56) References Cited

OTHER PUBLICATIONS

Office Action dated Sep. 9, 2020 for Chinese Application No. 201780040874.1, 20 pages.
Office Action dated Dec. 11, 2019 for Brazilian Application No. BR1120180085138, 6 pages.
Office Action dated May 12, 2021 for Korean Application No. 10-2018-7037693, 7 pages.
Office Action dated Sep. 15, 2020 for Japanese Application No. 2018-567854, 8 pages.
Office Action dated Feb. 16, 2021 for Japanese Application No. 2018-567856, 2 pages.
Office Action dated Aug. 19, 2020 for KR Application No. 20187037693, filed Jun. 27, 2017, 21 pages.
Office Action dated Mar. 2, 2021 for Japanese Application No. 2018-567947, 4 pages.
Office Action dated Mar. 22, 2019 for Korean Application No. 10-2018-7012422, 19 pages.
Office Action dated Mar. 22, 2019 for Korean Application No. 10-2018-7012428, 22 pages.
Office Action dated Jul. 23, 2019 for Japanese Application No. 2018-521928, 14 pages.
Office Action dated Jul. 23, 2019 for Japanese Application No. 2018-522061, 9 pages.
Office Action dated Feb. 25, 2020 for Japanese Application No. 2018-567854, 7 pages.
Office Action dated Feb. 25, 2020 for Japanese Application No. 2018-567947, 6 pages.
Office Action dated Feb. 25, 2020 for Japanese Application No. 2018-567856, 6 pages.
Office Action dated Jun. 25, 2019 for Japanese Application No. 2018-519932, 5 pages.
Office Action dated Sep. 26, 2019 for Korean Application No. 10-2018-7012353, 15 pages.
Office Action dated Dec. 27, 2019 for Chinese Application No. 201680049091, 25 pages.
Office Action dated Mar. 28, 2019 for Canadian Application No. 3003520, , 3 pages.
Office Action dated Mar. 29, 2019 for Korean Application No. 10-2018-7012366, 6 pages.
Office Action dated Oct. 29, 2018 for Russian Application No. 2018115542, 9 pages.
Office Action dated Feb. 4, 2020 for Japanese Application No. 2018-507621, 29 pages.
Office Action dated Feb. 7, 2019 for Korean Application No. 10-2018- 7006076, 10 pages.
Office Action dated May 7, 2019 for Japanese Application No. 2018-507621, 8 pages.
Office Action dated Dec. 9, 2019 for Canadian Application No. 3003521, 6 pages.
Office Action dated Apr. 29, 2021, for Malaysian Application No. PI2018701525, 3 pages.
Todaka T., et al., "Low Curie Temperature Material for Induction Heating Self- Temperature Controlling System," Journal of Magnetism and Magnetic Materials, vol. 320 (20), Oct. 2008, pp. e702-e707.
Notice of Reasons for Refusal received for Japanese Patent Application No. 2022-011143, dated Mar. 28, 2023, 12 pages (6 pages of English Translation and 6 pages of Official Copy).
Thorsen , et al., Application and File History for U.S. Appl. No. 16/647,325, filed Mar. 13, 2020.
Decision of Refusal received for Japanese Patent Application No. 2020-191838, dated Feb. 28, 2023, 6 pages '3 pages of English Translation and 3 pages of Official Copy).
Communication pursuant to Article 94(3) EPC for Application No. 17740628.7 dated May 9, 2022, 9 Pages.
Communication pursuant to Article 94(3) EPC for Application No. 17740631.1 dated Oct. 18, 2022, 6 Pages.
Decision to Grant a Patent dated Mar. 15, 2022 for Japanese Application No. 2020-183062, 5 pages (2 pages of English Translation and 3 pages of Official Copy).
European Office Action for Application No. 21213373.0, dated May 9, 2022, 6 Pages.
European Search Report for Application No. 21213373.0, dated Apr. 26, 2022, 7 Pages.
Extended European Search Report for Application No. 20205060.5, dated Aug. 6, 2021, 20 Pages.
Extended Search Report received for European Patent Application No. 22166210.9, dated Oct. 31, 2022, 11 bages.
Notice of Reasons for Rejection received for Japanese Patent Application No. 2020-528003, dated Jul. 20, 2021, 3 Pages (English Translation Only).
Notice of Reasons of Refusal received for Japanese Patent Application No. 2020-191838, dated Jul. 5, 2022, 6 pages (3 pages of English Translation and 3 pages of Official Copy).
Notification of Reason for Refusal dated Jan. 3, 2022 for Korean Application No. 10-2020-7018918, 12 pages (6 pages of English Translation and 6 pages of Official Copy).
Office Action and Search Report for Chinese Application No. 201880059756, dated Jan. 14, 2022, 11 pages (7 pages of English Translation and 4 pages of Official copy).
Office Action and Search Report for Russian Application No. 2020134245, dated Jan. 19, 2022, 27 pages (16 pages of English Translation and 11 pages of Official Copy).
Office Action and Search Report dated Jan. 18, 2022 for Russian Application No. 2020134241, 22 pages (11 pages of English Translation and 11 pages of Official Copy).
Office Action for Brazilian Application No. 112018077348-4, dated Sep. 27, 2021, 4 pages (Official Copy Only).
Office Action for Chinese Application No. 201780040300.4, dated Apr. 26, 2022, 9 pages (3 pages of English Translation and 6 pages of Official Copy).
Office Action For Chinese Application No. 201780040300.4, dated Nov. 15, 2021, 14 pages (7 pages of English Translation and 7 pages of Official Copy).
Office Action For Japanese Application No. 2020-175420, dated Oct. 12, 2021, 9 pages (5 pages of English Translation and 4 pages of Official Copy).
Office Action For Japanese Application No. 2020-182740, dated Oct. 12, 2021, 10 pages (5 pages of English Translation and 5 pages of Official Copy).
Office Action For Japanese Application No. 2020-182750, dated Oct. 12, 2021, 8 pages (4 pages of English Translation and 4 pages of Official Copy).
Office Action For Japanese Application No. 2020-183062, dated Nov. 30, 2021, 6 pages (3 pages of English Translation and 3 pages of Official Copy).
Office Action for Japanese Application No. 2022-010005, dated Mar. 15, 2022, 5 pages (2 pages of English Translation and 3 pages of Official Copy).
Office Action For Korean Application No. 10-2018-7037677, dated May 12, 2021, 4 pages (2 pages of English Translation and 2 pages of Official Copy).
Office Action for Korean Application No. 10-2020-7011369, dated May 10, 2022, 18 pages (9 pages of English Translation and 9 pages of Official Copy).
Office action for Korean Application No. 10-2020-7018918, dated Jul. 27, 2022, 6 pages (3 pages of English Translation and 3 pages of Official Copy).
Office Action For Korean Application No. 10-2021-7018056, dated Oct. 27, 2021, 21 pages (12 pages of English Translation and 9 pages of Official Copy).
Office Action For Korean Application No. 10-2021-7023346, dated Dec. 14, 2021, 40 pages (22 pages of English Translation and 18 pages of Official Copy).
Office Action for Malaysian Application No. PI2018002742, dated Apr. 21, 2021, 4 pages (English Translation Only).
Office Action For Russian Application No. 2020135851, dated May 24, 2021, 13 pages (Official Copy Only).
Office Action for Ukrainian Application No. a201813017, dated May 6, 2022, 3 pages (Official Copy Only).
Office Action dated May 12, 2021 for Chinese Application No. 201780040874.1, 15 pages (8 pages of English Translation and 7 pages of Official Copy).

(56) References Cited

OTHER PUBLICATIONS

Office Action dated Jun. 22, 2022 for Russian Application No. 2019107295, 8 pages (2 pages of English Translation and 6 pages of Official Copy).
Aoun, Abi , Application and File History for U.S. Appl. No. 15/733,194, filed Jun. 8, 2020.
Aoun, Abi , Application and File History for U.S. Appl. No. 16/311,405, filed Dec. 19, 2018.
Aoun, Abi , Application and File History for U.S. Appl. No. 16/311,411, filed Dec. 19, 2018.
Aoun, Abi , Application and File History for U.S. Appl. No. 16/311,418, filed Dec. 19, 2018.
Blandino , et al., Application and File History for U.S. Appl. No. 14/927,532, filed Oct. 30, 2015.
Blandino , et al., Application and File History for U.S. Appl. No. 14/927,539, filed Oct. 30, 2015.
Blandino , et al., Application and File History for U.S. Appl. No. 14/927,551, filed Oct. 30, 2015.
Blandino , et al., Application and File History for U.S. Appl. No. 14/927,556, filed Oct. 30, 2015, 60 Pages.
Blandino, Thomas P., Application and File History for U.S. Appl. No. 15/772,394, filed Apr. 30, 2018.
Blandino , et al., Application and File History for U.S. Appl. No. 16/946,043, filed Jun. 3, 2020.
Blandino, Thomas P., Application and File History for U.S. Patent Application No. U.S. Appl. No. 15/754,834, filed Feb. 23, 2018.
Blandino, Thomas P., Application and File History for U.S. Patent Application No. U.S. Appl. No. 15/772,396, filed Apr. 30, 2018.
Blandino, Thomas P., Application and File History for U.S. Patent Application No. U.S. Appl. No. 15/772,399, filed Apr. 30, 2018.
Kaufman , et al., Application and File History for U.S. Appl. No. 14/840,897, filed Aug. 31, 2015.
Kaufman , et al., Application and File History for U.S. Appl. No. 14/927,529, filed Oct. 30, 2015.
Kaufman , et al., Application and File History for U.S. Appl. No. 14/927,537, filed Oct. 30, 2015.
Kaufman , et al., Application and File History for U.S. Appl. No. 16/947,215, filed Jul. 23, 2020.
Kaufman, Duane A, Application and File History for U.S. Patent Application No. U.S. Appl. No. 15/772,391, filed Apr. 30, 2018.
Office Action received for Brazilian Patent Application No. 122022011678-7, dated Mar. 7, 2023, 10 pages (Official Copy Only).

ARTICLE FOR USE WITH APPARATUS FOR HEATING SMOKABLE MATERIAL

PRIORITY CLAIM

The present application is a Continuation Application of Ser. No. 15/772,396, filed Apr. 30, 2018, which is a National Phase entry of PCT Application No. PCT/EP2016/075736, filed Oct. 26, 2016, which claims priority from U.S. patent application Ser. No. 14/927,551, filed Oct. 30, 2015, each of which is hereby fully incorporated herein by reference.

TECHNICAL FIELD

The present disclosure relates to apparatus for heating smokable material to volatilize at least one component of the smokable material, to articles for use with such apparatus, and to systems comprising such apparatus and such articles.

BACKGROUND

Smoking articles such as cigarettes, cigars and the like burn tobacco during use to create tobacco smoke. Attempts have been made to provide alternatives to these articles by creating products that release compounds without combusting. Examples of such products are so-called "heat not burn" products or tobacco heating devices or products, which release compounds by heating, but not burning, material. The material may be, for example, tobacco or other non-tobacco products, which may or may not contain nicotine.

SUMMARY

A first aspect of the present disclosure provides an article for use with apparatus for heating smokable material to volatilize at least one component of the smokable material, wherein the article comprises a mass of smokable material, and wherein an exterior of the article has a length, a width perpendicular to the length, and a depth perpendicular to each of the length and the width, wherein the length is greater than or equal to the width, and wherein the width is greater than the depth.

In an exemplary embodiment, the mass of smokable material is fixed relative to the exterior of the article.

In an exemplary embodiment, the depth of the exterior of the article is less than a half of the width of the exterior of the article. In an exemplary embodiment, the depth of the exterior of the article is less than a quarter of the width of the exterior of the article.

In an exemplary embodiment, the article comprises a substrate, and the mass of smokable material is on the substrate.

In an exemplary embodiment, the substrate has a length, a width perpendicular to the length of the substrate, and a depth perpendicular to each of the length and the width of the substrate, wherein the length of the substrate is greater than or equal to the width of the substrate, and wherein the width of the substrate is greater than the depth of the substrate.

In an exemplary embodiment, the length, width and depth of the substrate are substantially parallel to the length, width and depth, respectively, of the exterior of the article.

In an exemplary embodiment, the substrate comprises heating material that is heatable by penetration with a varying magnetic field to heat the smokable material.

In an exemplary embodiment, the substrate consists entirely, or substantially entirely, of the heating material.

In an exemplary embodiment, the heating material comprises one or more materials selected from the group consisting of: an electrically-conductive material, a magnetic material, and a magnetic electrically-conductive material.

In an exemplary embodiment, the heating material comprises a metal or a metal alloy.

In an exemplary embodiment, the heating material comprises one or more materials selected from the group consisting of: aluminum, gold, iron, nickel, cobalt, conductive carbon, graphite, plain-carbon steel, stainless steel, ferritic stainless steel, copper, and bronze.

In an exemplary embodiment, a first portion of the substrate is more susceptible to eddy currents being induced therein by penetration with a varying magnetic field than a second portion of the substrate.

In an exemplary embodiment, the article comprises a catalytic material on at least a portion of the substrate.

In an exemplary embodiment, the heating material is in contact with the smokable material.

In an exemplary embodiment, the heating material extends to opposite longitudinal ends of the mass of smokable material.

In an exemplary embodiment, the heating material extends to opposite lateral sides of the mass of smokable material.

In an exemplary embodiment, a portion of the substrate protrudes beyond an end of the mass of smokable material.

In an exemplary embodiment, the substrate is within the mass of smokable material.

In an exemplary embodiment, the substrate comprises smokable material.

In an exemplary embodiment, the substrate defines at least a portion of the exterior of the article.

In an exemplary embodiment, the mass of smokable material defines at least a portion of the exterior of the article.

In an exemplary embodiment, the article comprises a cover around the mass of smokable material. In an exemplary embodiment, the cover defines at least a portion of the exterior of the article. In an exemplary embodiment, the cover may be made of paper, card, cardboard, or a plastics material.

In an exemplary embodiment, the smokable material comprises tobacco and/or one or more humectants.

In an exemplary embodiment, the smokable material comprises reconstituted smokable material, such as reconstituted tobacco. In an exemplary embodiment, the smokable material is in the form of one of a gel, agglomerates, compressed material, or bound material.

In an exemplary embodiment, the mass of smokable material comprises a plurality of regions, wherein the smokable material in at least one of the regions has a form or chemical composition that differs from the form or chemical composition, respectively, of the smokable material of at least one other of the regions.

A second aspect of the present disclosure provides apparatus for heating smokable material to volatilize at least one component of the smokable material, the apparatus comprising: first and second bodies with a heating zone arranged therebetween, wherein the first body is movable relative to the second body to compress the heating zone, wherein the heating zone is for receiving at least a portion of an article comprising smokable material; and wherein one or each of the first and second bodies comprises at least a portion of a magnetic field generator for generating a varying magnetic field to be used in heating the smokable material when the portion of the article is located in the heating zone.

In an exemplary embodiment, the first body is rotatable relative to the second body to compress the heating zone.

In an exemplary embodiment, the portion of a magnetic field generator comprises an electrically-conductive coil.

In an exemplary embodiment, the, or each, magnetic field generator is for generating a varying magnetic field that penetrates the heating zone.

In an exemplary embodiment, one or each of the first and second bodies comprises heating material that is heatable by penetration with a varying magnetic field to heat the heating zone.

A third aspect of the present disclosure provides apparatus for heating smokable material to volatilize at least one component of the smokable material, the apparatus comprising: a heating zone for receiving at least a portion of an article comprising smokable material, wherein the heating zone has a length, a width perpendicular to the length, and a depth perpendicular to each of the length and the width, wherein the length is greater than or equal to the width, and wherein the width is greater than the depth; and a magnetic field generator for generating a varying magnetic field to be used in heating the smokable material when the portion of the article is located in the heating zone.

In an exemplary embodiment, the magnetic field generator comprises an electrical power source that is offset from the heating zone in a direction parallel to the depth of the heating zone.

In an exemplary embodiment, the electrical power source has a length, a width perpendicular to the length of the electrical power source, and a depth perpendicular to each of the length and the width of the electrical power source, wherein the length of the electrical power source is greater than or equal to the width of the electrical power source, and wherein the width of the electrical power source is greater than the depth of the electrical power source; and wherein the length, width and depth of the electrical power source are substantially parallel to the length, width and depth, respectively, of the heating zone.

In an exemplary embodiment, the apparatus comprises first and second bodies, wherein the heating zone is defined by and is arranged between the first and second bodies, and wherein one or each of the first and second bodies comprises at least a portion of a magnetic field generator for generating a varying magnetic field to be used in heating the smokable material when the portion of the article is located in the heating zone.

In an exemplary embodiment, the portion of a magnetic field generator comprises a two-dimensional electrically-conductive coil.

In an exemplary embodiment, the apparatus comprises a third body comprising at least a portion of an electrical circuit; wherein a first side of the second body is attached to the first body via a first element, and a second side of the second body is attached to the third body via a second element; and wherein the second body is between the first and third bodies.

A fourth aspect of the present disclosure provides a system, comprising: apparatus for heating smokable material to volatilize at least one component of the smokable material; and an article for use with the apparatus, wherein the article comprises a mass of smokable material, and wherein an exterior of the article has a length, a width perpendicular to the length, and a depth perpendicular to each of the length and the width, wherein the length is greater than or equal to the width, and wherein the width is greater than the depth; wherein the apparatus comprises a heating zone for receiving at least a portion of the article, and a magnetic field generator for generating a varying magnetic field to be used in heating the smokable material when the portion of the article is in the heating zone.

In an exemplary embodiment, the apparatus comprises heating material that is heatable by penetration with the varying magnetic field to heat the smokable material when the portion of the article is located in the heating zone.

In an exemplary embodiment, the article comprises heating material that is heatable by penetration with the varying magnetic field to heat the smokable material when the portion of the article is located in the heating zone.

In an exemplary embodiment, the apparatus of the system is the apparatus of the second aspect of the present disclosure. The apparatus of the system may have any one or more of the features discussed above as being present in respective exemplary embodiments of the apparatus.

In an exemplary embodiment, the apparatus of the system is the apparatus of the third aspect of the present disclosure. The apparatus of the system may have any one or more of the features discussed above as being present in respective exemplary embodiments of the apparatus.

BRIEF DESCRIPTION OF THE DRAWINGS

Embodiments of the disclosure will now be described, by way of example only, with reference to the accompanying drawings, in which.

DETAILED DESCRIPTION

Figure 1:
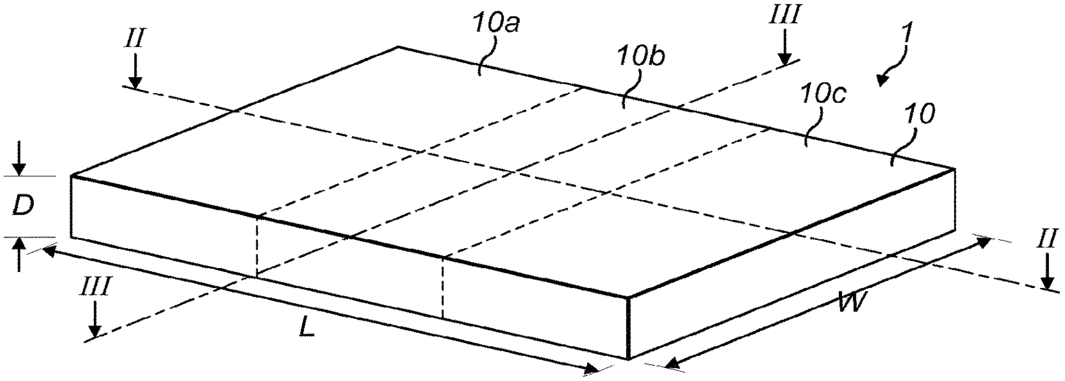
FIG. 1 shows a schematic perspective view of an example of an article for use with apparatus for heating smokable material to volatilize at least one component of the smokable material.

As used herein, the term "smokable material" includes materials that provide volatilized components upon heating, typically in the form of vapor or an aerosol. "Smokable material" may be a non-tobacco-containing material or a tobacco-containing material. "Smokable material" may, for example, include one or more of tobacco per se, tobacco derivatives, expanded tobacco, reconstituted tobacco, tobacco extract, homogenized tobacco or tobacco substitutes. The smokable material can be in the form of ground tobacco, cut rag tobacco, extruded tobacco, reconstituted tobacco, reconstituted smokable material, liquid, gel, gelled sheet, powder, or agglomerates, or the like. "Smokable material" also may include other, non-tobacco, products, which, depending on the product, may or may not contain nicotine. "Smokable material" may comprise one or more humectants, such as glycerol or propylene glycol.

As used herein, the term "heating material" or "heater material" refers to material that is heatable by penetration with a varying magnetic field.

As used herein, the terms "flavor" and "flavorant" refer to materials which, where local regulations permit, may be used to create a desired taste or aroma in a product for adult consumers. They may include extracts (e.g., licorice, hydrangea, Japanese white bark magnolia leaf, chamomile, fenugreek, clove, menthol, Japanese mint, aniseed, cinnamon, herb, wintergreen, cherry, berry, peach, apple, Drambuie, bourbon, scotch, whiskey, spearmint, peppermint, lavender, cardamom, celery, cascarilla, nutmeg, sandalwood, bergamot, geranium, honey essence, rose oil, vanilla, lemon oil, orange oil, cassia, caraway, cognac, jasmine, ylang-ylang, sage, fennel, piment, ginger, anise, coriander, coffee, or a mint oil from any species of the genus *Mentha*), flavor enhancers, bitterness receptor site blockers, sensorial receptor site activators or stimulators, sugars and/or sugar substitutes (e.g., sucralose, acesulfame potassium, aspartame, saccharine, cyclamates, lactose, sucrose, glucose, fructose, sorbitol, or mannitol), and other additives such as charcoal, chlorophyll, minerals, botanicals, or breath freshening agents. They may be imitation, synthetic or natural ingredients or blends thereof. They may be in any suitable form, for example, oil, liquid, gel, powder, or the like.

Induction heating is a process in which an electrically-conductive object is heated by penetrating the object with a varying magnetic field. The process is described by Faraday's law of induction and Ohm's law. An induction heater may comprise an electromagnet and a device for passing a varying electrical current, such as an alternating current, through the electromagnet. When the electromagnet and the object to be heated are suitably relatively positioned so that the resultant varying magnetic field produced by the electromagnet penetrates the object, one or more eddy currents are generated inside the object. The object has a resistance to the flow of electrical currents. Therefore, when such eddy currents are generated in the object, their flow against the electrical resistance of the object causes the object to be heated. This process is called Joule, ohmic, or resistive heating. An object that is capable of being inductively heated is known as a susceptor.

It has been found that, when the susceptor is in the form of a closed circuit, magnetic coupling between the susceptor and the electromagnet in use is enhanced, which results in greater or improved Joule heating.

Magnetic hysteresis heating is a process in which an object made of a magnetic material is heated by penetrating the object with a varying magnetic field. A magnetic material can be considered to comprise many atomic-scale magnets, or magnetic dipoles. When a magnetic field penetrates such material, the magnetic dipoles align with the magnetic field. Therefore, when a varying magnetic field, such as an alternating magnetic field, for example as produced by an electromagnet, penetrates the magnetic material, the orientation of the magnetic dipoles changes with the varying applied magnetic field. Such magnetic dipole reorientation causes heat to be generated in the magnetic material.

When an object is both electrically-conductive and magnetic, penetrating the object with a varying magnetic field can cause both Joule heating and magnetic hysteresis heating in the object. Moreover, the use of magnetic material can strengthen the magnetic field, which can intensify the Joule heating.

In each of the above processes, as heat is generated inside the object itself, rather than by an external heat source by heat conduction, a rapid temperature rise in the object and more uniform heat distribution can be achieved, particularly through selection of suitable object material and geometry, and suitable varying magnetic field magnitude and orientation relative to the object. Moreover, as induction heating and magnetic hysteresis heating do not require a physical connection to be provided between the source of the varying magnetic field and the object, design freedom and control over the heating profile may be greater, and cost may be lower.

Figure 2:
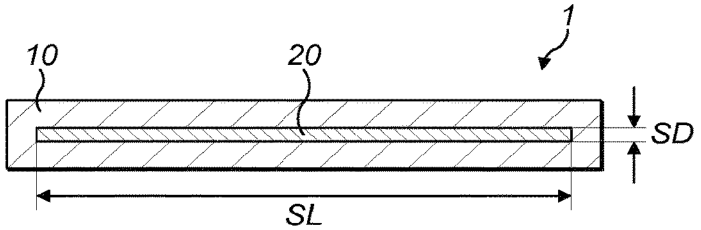
FIG. 2 shows a schematic cross-sectional view of the article of FIG. 1.
Figure 3:
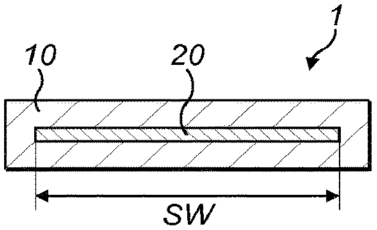
FIG. 3 shows another schematic cross-sectional view of the article of FIG. 1 taken at ninety degrees to the schematic cross-sectional view of FIG. 2.

Referring to FIGS. 1, 2 and 3 there are shown a schematic perspective view and two schematic cross-sectional views taken at ninety degrees to each other, of an example of an article according to an embodiment of the disclosure. In this embodiment, the article 1 comprises a mass of smokable material 10 and a substrate 20, and the mass of smokable material 10 is arranged on the substrate 20. The article 1 is for use with apparatus for heating the smokable material 10 to volatilize at least one component of the smokable material 10 without burning the smokable material 10. Example such apparatus are described below.

The article 1 has an exterior, which may contact the apparatus in use. The exterior of the article 1 has a length L, a width W, and a depth D. The width W is perpendicular to the length L. The depth D is perpendicular to each of the length L and the width W. In this embodiment, the length L is greater than the width W, and the width W is greater than the depth D. In this embodiment, the exterior of the article 1 is a rectangular cuboid, so that the article 1 is elongate with a substantially rectangular cross-section. However, in other embodiments, the length L may be equal or substantially equal to the width W, so that the article 1 is not elongate as such. In some such embodiments, the exterior of the article 1 may be a square cuboid. In some embodiments, the exterior of the article 1 may be other than cuboid. For example, in some embodiments, some or all of the edges of the exterior of the article 1 may be beveled or rounded. In some embodiments, the article 1 may have other than a substantially rectangular cross-section, such as an elliptical cross-section.

The mass of smokable material 10 is fixed relative to the exterior of the article 1. In this embodiment, the mass of smokable material 10 defines all of the exterior of the article 1. In other embodiments, some or all of the exterior of the article 1 may instead be defined by a component of the article 1 other than the mass of smokable material 10, such as a cover that may extend at least partially around the smokable material 10. Such a cover may be made of, for example, paper, card, cardboard, or a plastics material, or the like. Such a cover could be permeable or have gaps therethrough. The cover may, for example, be made of a woven or non-woven material.

In this embodiment, the substrate 20 comprises heating material that is heatable by penetration with a varying magnetic field to heat the smokable material 10. Examples of such heating material are described below. In this embodiment, the substrate 20 is within the mass of smokable material 10. More specifically, in this embodiment, the substrate 20 is entirely enveloped or surrounded by the mass of smokable material 10. Therefore, as the heating material is heated by a varying magnetic field in use, heat dissipated from the heating material heats the mass of smokable material 10.

In this embodiment, the substrate 20 is spaced from both opposite longitudinal ends of the mass of smokable material 10 and from opposite lateral sides of the mass of smokable material 10. This may help to ensure that heat generated in the substrate 20 is efficiently transferred to the smokable material. However, in other embodiments, the substrate 20 may extend to only one or to both of the opposite longitudinal ends of the mass of smokable material 10, and/or to only one or to both of the opposite lateral sides of the mass of smokable material 10. This can help to provide yet more uniform heating of the smokable material 10 in use. In some embodiments, a portion of the substrate 20 may protrude beyond an end, such as a longitudinal end, of the mass of smokable material 10 so as to form part of the exterior of the article 1, as described below with reference to FIG. 5. The portion of the substrate 20 may be contactable by a temperature monitor of the apparatus with which the article 1 is usable, as discussed in more detail below. The portion of the substrate 20 may comprise or consist of the heating material.

Figure 4:
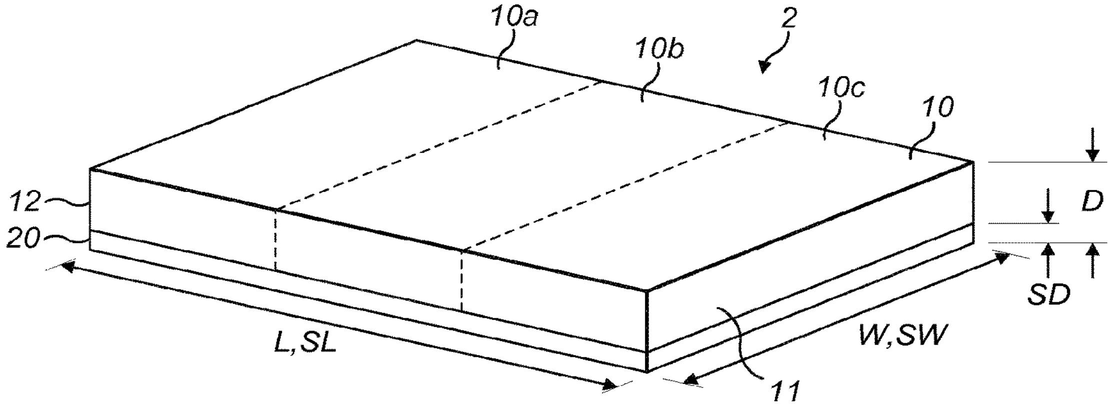
FIG. 4 shows a schematic perspective view of an example of another article for use with apparatus for heating smokable material to volatilize at least one component of the smokable material.

Referring to FIG. 4 there is shown a schematic perspective view of an example of another article according to an embodiment of the disclosure. The article 2 of this embodiment is identical to the article 1 of FIGS. 1 to 3, except for the form and location of the substrate 20 relative to the mass of smokable material 10. Any of the herein-described possible variations to the article 1 of FIGS. 1 to 3 may be made to the article 2 of FIG. 4 to form separate respective embodiments. The article 2 is for use with apparatus for heating the smokable material 10 to volatilize at least one component of the smokable material 10 without burning the smokable material 10, such as one of the example apparatus described below.

The exterior of the article 2 again has a length L, a width W, and a depth D. The width W is perpendicular to the length L, and the depth D is perpendicular to each of the length L and the width W. In this embodiment, the length L is greater than the width W, and the width W is greater than the depth D. In this embodiment, the exterior of the article 2 is a rectangular cuboid, so that the article 2 is elongate with a substantially rectangular cross-section. However, as indicated above, any of the above-described possible variations to the article 1 of FIGS. 1 to 3 may be made to the article 2 of FIG. 4 to form separate respective embodiments.

The mass of smokable material 10 is fixed relative to the exterior of the article 2. However, in contrast to the article 1 of FIGS. 1 to 3, in this embodiment the mass of smokable material 10 defines only a portion of the exterior of the article 2. The substrate 20 defines another portion of the exterior of the article 2. In this embodiment, the exterior of the article 2 is defined by the combination of the mass of smokable material 10 and the substrate 20. However, in other embodiments, some or all of the exterior of the article 2 may instead be defined by a component of the article 2 other than the mass of smokable material 10 or substrate 20, such as a cover that may extend at least partially around the smokable material 10. Such a cover may be made of, for example, paper, card, cardboard, or a plastics material, or the like.

In this embodiment, the heating material of the substrate 20 is in contact with the smokable material 10. However, as opposed to the arrangement shown in FIGS. 1 to 3, in this embodiment, the substrate 20 is not within the mass of smokable material 10. Instead, the mass of smokable material 10 is located on one face of the substrate 20. The article 2 may thus be manufactured in a process that does not involve enveloping the substrate 20 in the smokable material 10, which may simplify manufacture.

In this embodiment, the heating material of the substrate 20 extends to opposite longitudinal ends of the mass of smokable material 10. This can help provide more uniform heating of the smokable material 10 in use, and may aid manufacture of the article 2. For example, the article 2 may be formed by cutting the article 2 from an elongate or larger assembly comprising smokable material on substrate material. However, in some embodiments, a portion of the substrate 20 may protrude beyond an end, such as a longitudinal end, of the mass of smokable material 10 so as to form part of the exterior of the article 2. The protruding portion of the substrate 20 may be contactable by a temperature monitor of the apparatus with which the article 2 is usable, as discussed in more detail below. The protruding portion of the substrate 20 may comprise or consist of the heating material.

Figure 5:
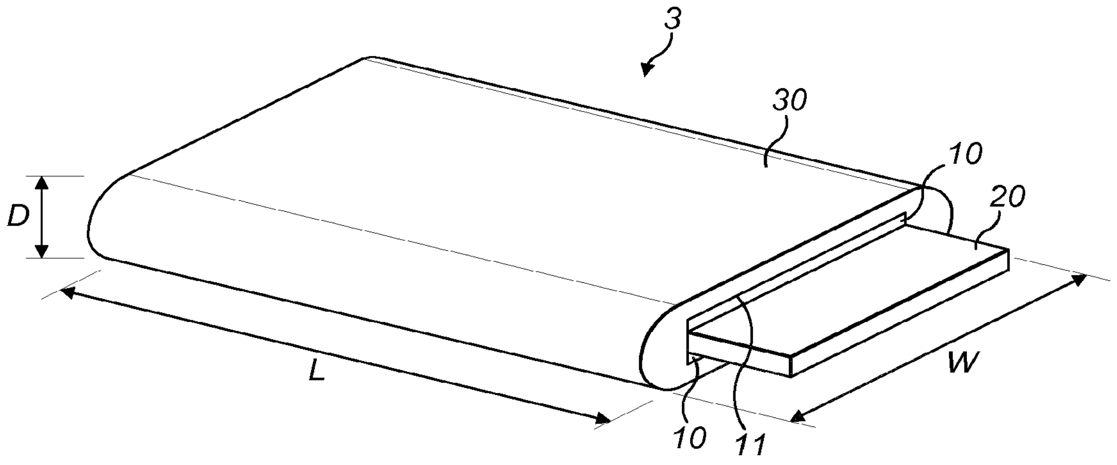
FIG. 5 shows a schematic perspective view of an example of another article for use with apparatus for heating smokable material to volatilize at least one component of the smokable material.

Referring to FIG. 5 there is shown a schematic perspective view of an example of another article according to an embodiment of the disclosure. The article 3 of this embodiment is identical to the article 1 of FIGS. 1 to 3, except for the form of the exterior of the article 3 and the form of the substrate 20 relative to the mass of smokable material 10. Any of the herein-described possible variations to the articles 1, 2 of FIGS. 1 to 4 may be made to the article 3 of FIG. 5 to form separate respective embodiments. The article 3 is for use with apparatus for heating the smokable material 10 to volatilize at least one component of the smokable material 10 without burning the smokable material 10, such as one of the example apparatus described below.

In this embodiment, the exterior of the article 3 again has a length L, a width W, and a depth D. The width W is perpendicular to the length L, and the depth D is perpendicular to each of the length L and the width W. In this embodiment, the length L is greater than the width W, and the width W is greater than the depth D. In this embodiment, the exterior of the article 3 is a rectangular cuboid, except that the elongate edges of the article 3 running in the direction of the length L of the article 3 are rounded. The article 3 is thus elongate with a substantially rounded-rectangular cross-section. In variations to this embodiment, the curved edges may instead be beveled or right-angled edges. In some embodiments, the length L may be equal or substantially equal to the width W, so that the article 3 is not elongate as such. In some embodiments, the article 3 may have other than a round-rectangular cross-section, such as a substantially rectangular cross-section or an elliptical cross-section.

The mass of smokable material 10 is fixed relative to the exterior of the article 2. However, in contrast to the article 2 of FIG. 4, in this embodiment the mass of smokable material 10 defines only a small proportion of the exterior of the article 3. Similarly, the substrate 20 defines only a small proportion of the exterior of the article 3. A majority of the exterior of the article 3 is instead defined by a cover 30 of the article 3. The cover 30 may be made of, for example, paper, card, cardboard, or a plastics material, or the like.

In this embodiment, in contrast to the article 1 of FIGS. 1 to 3, a portion of the substrate 20 protrudes beyond an end of the mass of smokable material 10. In this embodiment, the end is a longitudinal end of the mass of smokable material 10. In this embodiment, this portion of the substrate 20 forms part of the exterior of the article 3. The portion of the substrate 20 may be contactable by a temperature monitor of the apparatus with which the article 3 is usable, as discussed in more detail below. The portion of the substrate 20 may comprise or consist of the heating material.

In this embodiment, the cover 30 encircles the smokable material 10 so that the smokable material 10 is within the cover 30. In some embodiments, the cover 30 may also cover the longitudinal end of the article 3 opposite from the protruding portion of the substrate 20 discussed above. In this embodiment, most or all of the substrate 20 is kept out of contact with the cover 30. This can help avoid or reduce singeing of the cover 30 as the substrate 20 is heated in use. However, in other embodiments, the substrate 20 may be in contact with the cover 30.

In some embodiments, any one of the covers 30 discussed above may comprise a thermal insulation. The thermal insulation may comprise one or more materials selected from the group consisting of: aerogel, vacuum insulation, wadding, fleece, non-woven material, non-woven fleece, woven material, knitted material, nylon, foam, polystyrene, polyester, polyester filament, polypropylene, a blend of polyester and polypropylene, cellulose acetate, paper or card, and corrugated material such as corrugated paper or card. The thermal insulation may additionally or alternatively comprise an air gap. Such thermal insulation can help prevent heat loss to components of the apparatus, and provide more efficient heating of the smokable material 10 within the cover 30. In some embodiments, the insulation may have a thickness of up to one millimeter, such as up to 0.5 millimeters.

In each of the articles 1, 2, 3 shown in FIGS. 1 to 5, the substrate 20 comprises heating material that is heatable by penetration with a varying magnetic field to heat the smokable material 10. In each of the illustrated embodiments, the substrate 20 consists entirely, or substantially entirely, of the heating material. However, this need not be the case in other embodiments. In each of the embodiments discussed above, the heating material is aluminum. However, in other embodiments, the heating material may comprise one or more materials selected from the group consisting of: electrically-conductive material, magnetic material, and magnetic electrically-conductive material. The heating material may comprise a metal or a metal alloy. The heating material may comprise one or more materials selected from the group consisting of: aluminum, gold, iron, nickel, cobalt, conductive carbon, graphite, plain-carbon steel, stainless steel, ferritic stainless steel, copper, and bronze. Other heating material(s) may be used in other embodiments. It has been found that, when magnetic electrically-conductive material is used as the heating material, magnetic coupling between the substrate 20 and an electromagnet of the apparatus in use may be enhanced. In addition to potentially enabling magnetic hysteresis heating, this can result in greater or improved Joule heating of the heating material, and thus greater or improved heating of the smokable material 10.

In each of the articles 1, 2, 3 shown in FIGS. 1 to 5, the heating material of the substrate 20 is in contact with the smokable material 10. Thus, when the heating material is heated by penetration with a varying magnetic field, heat may be transferred directly from the heating material to the smokable material 10. In other embodiments, the heating material may be kept out of contact with the smokable material 10. For example, in some embodiments, the article 1, 2, 3 may comprise a thermally-conductive barrier that is free of heating material and that spaces the substrate 20 from the smokable material 10. In some embodiments, the thermally-conductive barrier may be a coating on the substrate 20. The provision of such a barrier may be advantageous to help to dissipate heat to alleviate hot spots in the heating material.

In each of the articles 1, 2, 3 shown in FIGS. 1 to 5, the substrate 20 has a length SL, a width SW, and a depth SD. The width SW is perpendicular to the length SL. The depth SD is perpendicular to each of the length SL and the width SW. In the illustrated embodiments, the length SL is greater than the width SW, and the width SW is greater than the depth SD. However, in some embodiments, the length SL may be equal or substantially equal to the width SW.

In each of the articles 1, 2, 3 shown in FIGS. 1 to 5, the substrate 20 thus has two opposing major surfaces joined by two minor surfaces. Therefore, the depth SD or thickness of the substrate 20 is relatively small as compared to the other dimensions of the substrate 20. This may help to ensure that heat generated in the substrate 20 is efficiently transferred to the smokable material. In this embodiment, the substrate 20 has a rectangular, or substantially rectangular, cross section perpendicular to its length SL. However, in other embodiments, the substrate 20 may have a cross-section that is a shape other than rectangular, such as circular, elliptical, annular, polygonal, square, triangular, star-shaped, or radially-finned.

In each of the illustrated embodiments, the length SL, width SW and depth SD of the substrate 20 are substantially parallel to the length L, width W and depth D, respectively, of the exterior of the article 1, 2, 3. Moreover, in each of the illustrated embodiments, the substrate 20 extends along a longitudinal axis that is substantially aligned with a longitudinal axis of the article 1, 2, 3. This can help to provide more uniform heating of the smokable material 10 in use. In the articles 1, 3 of FIGS. 1 to 3 and 5, the aligned axes are coincident. In a variation to these embodiments, the aligned axes may be parallel to each other, as is the case in the article 2 of FIG. 4. However, in other embodiments, the axes may be oblique to each other, or one or both of the substrate 20 and the article 1, 2, 3 may not have a longitudinal axis.

In some embodiments, the substrate 20 has a depth SD of less than five millimeters. In some embodiments, the substrate 20 has a depth SD of less than two millimeters. In some embodiments, the substrate 20 has a depth SD of between 0.1 and 0.6 millimeters, such as 0.3 millimeters.

In each of the illustrated embodiments, the substrate 20 is impermeable to air or volatilized material, and is substantially free of discontinuities. The substrate 20 may thus be relatively easy to manufacture. However, in variations to these embodiments, the substrate 20 may be permeable to air and/or permeable to volatilized material created when the smokable material 10 is heated. Such a permeable nature of the substrate 20 may help air passing through the article 1, 2, 3 to pick up the volatilized material created when the smokable material 10 is heated. In some embodiments, such a permeable nature of the substrate 20 may also act to impede an undesired thermal path to an end of the substrate 20, at which heat could leak from the article 1, 2, 3 without greatly heating the smokable material 10.

In each of the articles 1, 2, 3 shown in FIGS. 1 to 5, the cross section of the substrate 20 is constant along the length of the substrate 20. Moreover, in these embodiments, the substrate 20 is planar, or substantially planar. The substrate 20 of each of these embodiments could be considered a flat strip. However, in other embodiments, this may not be the case.

For example, in some embodiments, the substrate 20 may follow a wavelike or wavy path. The path may be a sinusoidal path. In some embodiments, the substrate 20 may be twisted. In some such embodiments, the substrate 20 may be considered to be twisted about a longitudinal axis that is coincident with the longitudinal axis of the article 1, 2, 3. In some embodiments, the substrate 20 may be corrugated. In some such embodiments, the substrate 20 may be considered to follow a longitudinal axis that is coincident with the longitudinal axis of the article 1, 2, 3.

Such non-planar shapes of the substrate 20 may help air passing through the article 1, 2, 3 to pick up the volatilized material created when the smokable material 10 is heated. Non-planar shapes can provide a tortuous path for air to follow, creating turbulence in the air and causing better heat transfer from the heating material to the smokable material 10. The non-planar shapes can also increase the surface area of the substrate 20 per unit length of the substrate 20. This can result in greater or improved Joule heating of the substrate 20, and thus greater or improved heating of the smokable material 10.

Non-planar substrates 20 of other embodiments may have shapes other than those discussed above. For example, in some embodiments the substrate 20 may be helical, a spiral shape, comprise a plate or strip or ribbon having protrusions thereon and/or indentations therein, comprise a mesh, comprise expanded metal, or have a non-uniform non-planar shape.

In each of the above-described embodiments, the mass of smokable material 10 is said to be fixed relative to the exterior of the article 1, 2, 3. However, in other embodiments, the mass of smokable material 10 may be movable, at least to a degree, relative to the exterior of the article 1, 2, 3.

In each of the articles 1, 2, 3 shown in FIGS. 1 to 5, the mass of smokable material 10 comprises first, second and third regions 10*a*, 10*b*, 10*c* (not expressly shown in FIG. 5 or FIGS. 2 and 3). The smokable material 10 in at least one of these regions 10*a*, 10*b*, 10*c* has a form or chemical composition that differs from the form or chemical composition, respectively, of the smokable material 10 of at least one other of these regions 10*a*, 10*b*, 10*c*. In some embodiments, the smokable material of at least one of these regions 10*a*, 10*b*, 10*c* has a form or chemical composition so as to be heatable more quickly than the smokable material of at least one other of these regions 10*a*, 10*b*, 10*c*. For example, the regions 10*a*, 10*b*, 10*c* may have different respective mean sizes of particles of the smokable material. In some embodiments, the difference in chemical composition may comprise a difference in quantities by weight of moisture, a vapor forming agent, such as glycerol, or a smoke modifying substance, such as a flavorant. By providing the different regions 10*a*, 10*b*, 10*c* with different quantities of moisture, smoke modifying agents or flavorants, in some embodiments a change in flavor of generated vapor for user inhalation is achievable. This effect may be enabled or enhanced by the apparatus with which the article 1, 2, 3 is used being capable of heating the different regions 10*a*, 10*b*, 10*c* separately and/or independently.

Although, in the illustrated articles 1, 2, 3, the regions 10*a*, 10*b*, 10*c* are relatively located in the length L direction of the article 1, 2, 3, in other embodiments the regions 10*a*, 10*b*, 10*c* may be relatively located along the width W or depth D direction of the article 1, 2, 3. Although three regions 10*a*, 10*b*, 10*c* are shown in each of FIGS. 1, 4 and 5, in other embodiments there may be two or more than three such regions. In some embodiments, all of the mass of smokable material 10 is of substantially constant form and/or chemical composition.

In some embodiments, the depth D of the exterior of the article 1, 2, 3 may be less than a half of the width W of the exterior of the article 1, 2, 3. In each of the articles 1, 2, 3 shown in FIGS. 1 to 5, the depth D of the exterior of the article 1, 2, 3 is less than a quarter of the width W of the exterior of the article 1, 2, 3. However, in other embodiments, the depth D may be greater than half the width W. The smaller the depth D relative to the width W, the greater the surface area of the exterior of the article 1, 2, 3 for a given volume of the article 1, 2, 3. This can result in greater or improved heating of the smokable material 10 in use, and/or greater, easier or improved release from the article 1, 2, 3 of volatilized material created when the smokable material 10 is heated.

In some embodiments, which may be respective variations to the embodiments discussed above, a first portion of the substrate 20 may be more susceptible to eddy currents being induced therein by penetration with a varying magnetic field than a second portion of the substrate 20. The first portion of the substrate 20 may be more susceptible as a result of the first portion of the substrate 20 being made of a first material, the second portion of the substrate 20 being made of a different second material, and the first material being of a higher susceptibility to eddy currents being induced therein than the second material. For example, one of the first and second portions may be made of iron, and the other of the first and second portions may be made of graphite. Alternatively or additionally, the first portion of the substrate 20 may be more susceptible as a result of the first portion of the substrate 20 having a different thickness to the second portion of the substrate 20. In some embodiments, such first and second portions are located adjacent each other in the longitudinal direction of the article 1, 2, 3 or of the substrate 20, but in other embodiments this need not be the case. For example, in some embodiments the first and second portions may be disposed adjacent each other in a direction perpendicular to the longitudinal direction of the article 1, 2, 3 or of the substrate 20.

Such varying susceptibility of the substrate 20 to eddy currents being induced therein can help achieve progressive heating of the smokable material 10, and thereby progressive generation of vapor. For example, the higher susceptibility portion may be able to heat a first region of the smokable material 10 relatively quickly to initialize volatilization of at least one component of the smokable material 10 and formation of vapor in the first region of the smokable material 10. The lower susceptibility portion may be able to heat a second region of the smokable material 10 relatively slowly to initialize volatilization of at least one component of the smokable material 10 and formation of vapor in the second region of the smokable material 10. Accordingly, vapor is able to be formed relatively rapidly for inhalation by a user, and vapor can continue to be formed thereafter for subsequent inhalation by the user even after the first region of the smokable material 10 may have ceased generating vapor. The first region of the smokable material 10 may cease generating the vapor when it becomes exhausted of volatilizable components of the smokable material 10.

In other embodiments, all of the substrate 20 may be equally, or substantially equally, susceptible to eddy currents being induced therein by penetration with a varying magnetic field. In some embodiments, the substrate 20 may not be susceptible to such eddy currents. In such embodiments, the heating material may be a magnetic material that is non-electrically-conductive, and thus may be heatable by the magnetic hysteresis process discussed above.

In some embodiments, which may be respective variations to the embodiments discussed above, a plurality of the articles 1, 2, 3 may be arranged in a stack. The articles may be adhered to one another in the stack. Each of the articles 1, 2, 3 in the stack may be identical to each other of the articles 1, 2, 3 in the stack. Alternatively, one or more of the articles 1, 2, 3 in the stack may differ in construction from one or more other of the articles 1, 2, 3 in the stack. For example, any one or more of the articles in the stack may be one of the articles 1, 2, 3 discussed above, and one or more other of the articles in the stack may be a different one of the articles 1, 2, 3 discussed above. Smokable material may then be sandwiched between two bodies of heating material.

In some embodiments, which may be respective variations to the embodiments discussed above, the article 1, 2, 3 may comprise a plurality of substrates 20 within the mass of smokable material 10, wherein each of the substrates 20 comprises heating material that is heatable by penetration with a varying magnetic field. At least one of the plurality of substrates 20 may be more susceptible to eddy currents being induced therein by penetration with a varying magnetic field than at least one of the other of the plurality of substrates 20. This may be effected by the substrates 20 being made of different heating materials and/or having different thicknesses, for example, as discussed above. Again, such varying susceptibility of the substrates 20 can help achieve progressive heating of the smokable material 10, and thereby progressive generation of vapor, in a manner corresponding to that described above. The plurality of substrates 20 may be coplanar.

In some embodiments in which the substrate 20 comprises heating material, the article 1, 2, 3 may comprise a catalytic material on at least a portion of the substrate 20. The catalytic material may take the form of a coating on the substrate 20. The catalytic material may be provided on all surface(s) of the substrate 20, or on only some of the surface(s) of the substrate 20. The provision of such a catalytic material on the substrate 20 means that, in use, the article 1, 2, 3 may have a heated, chemically active surface. In use, the catalytic material may act to convert, or increase the rate of conversion of, a potential irritant to something that is less of an irritant.

In some embodiments, which may be respective variations to the embodiments discussed above, the substrate 20 may be free of heating material. For example, in some embodiments, the entire article 1, 2, 3 may be free of heating material. Some such articles may be usable with apparatus for heating the smokable material 10 to volatilize at least one component of the smokable material 10 without burning the smokable material 10, wherein the apparatus itself comprises heating material that is heatable by penetration with a varying magnetic field. In one embodiment, the substrate 20 comprises one or more materials that give the article 1, 2, 3 a sufficient degree of structure and/or robustness.

In some embodiments, the substrate 20 may comprise smokable material, such as tobacco. In some embodiments, the substrate 20 may comprise or consist entirely, or substantially entirely, of smokable material, e.g. tobacco, such as reconstituted smokable material, e.g. reconstituted tobacco. The latter is sometimes referred to as "tobacco recon". Depending on the thickness and constitution of the reconstituted smokable material, the majority or all of the whole article 1, 2, 3 may consist entirely, or substantially entirely, of smokable material.

In some embodiments, which may be respective variations to the embodiments discussed above, the substrate 20 may be omitted. That is, the article 1, 2, 3 may be free of a substrate. In some such embodiments, the article 1, 2, 3 may consist entirely, or substantially entirely, of the mass of smokable material 10. However, an appropriate binder might be required in order for the mass of smokable material 10 to retain its shape. The mass of smokable material 10 may be formed, for example, by a process involving compacting the smokable material 10 until it assumes the desired final shape.

In some embodiments, which may be respective variations to the embodiments discussed above, the article 1, 2, 3 may comprise a mouthpiece defining a passageway that is in fluid communication with the mass of smokable material 10. The mouthpiece may be made of any suitable material, such as a plastics material, cardboard, cellulose acetate, paper, metal, glass, ceramic, or rubber. In use, when the smokable material 10 is heated, volatilized components of the smokable material 10 can be readily inhaled by a user. In embodiments in which the article is a consumable article, once all or substantially all of the volatilizable component(s) of the smokable material 10 in the article has/have been spent, the user may dispose of the mouthpiece together with the rest of the article. This can be more hygienic than using the same mouthpiece with multiple articles, can help ensure that the mouthpiece is correctly aligned with the smokable material, and presents a user with a clean, fresh mouthpiece each time they wish to use another article. The mouthpiece, when provided, may comprise or be impregnated with a flavorant. The flavorant may be arranged so as to be picked up by heated vapor as the vapor passes through the passageway of the mouthpiece in use.

Each of the above-described articles 1, 2, 3 and described variants thereof may provide significant manufacturing advantages, at least due to the proportions of the exterior of the article, which may be considered "flat". For example, the proportions may lend themselves to the use of a wide variety of available materials, with a respective wide variety of thicknesses, thickness tolerances, and thermal, chemical and mechanical characteristics. Moreover, the proportions may help to ensure that the smokable material is located close to, or in contact with, the heating material, so that thermal conductivity is relatively large. This can help to decrease temperature rise time and increase temperature control responsiveness.

Each of the above-described articles 1, 2, 3 and described variants thereof may be used with an apparatus for heating the smokable material 10 to volatilize at least one component of the smokable material 10. The apparatus may be to heat the smokable material 10 to volatilize the at least one component of the smokable material 10 without burning the smokable material 10. Any one of the article(s) 1, 2, 3 and such apparatus may be provided together as a system. The system may take the form of a kit, in which the article 1, 2, 3 is separate from the apparatus. Alternatively, the system may take the form of an assembly, in which the article 1, 2, 3 is combined with the apparatus. Example such apparatus will now be described with reference to FIGS. 6 to 8.

Figure 6:
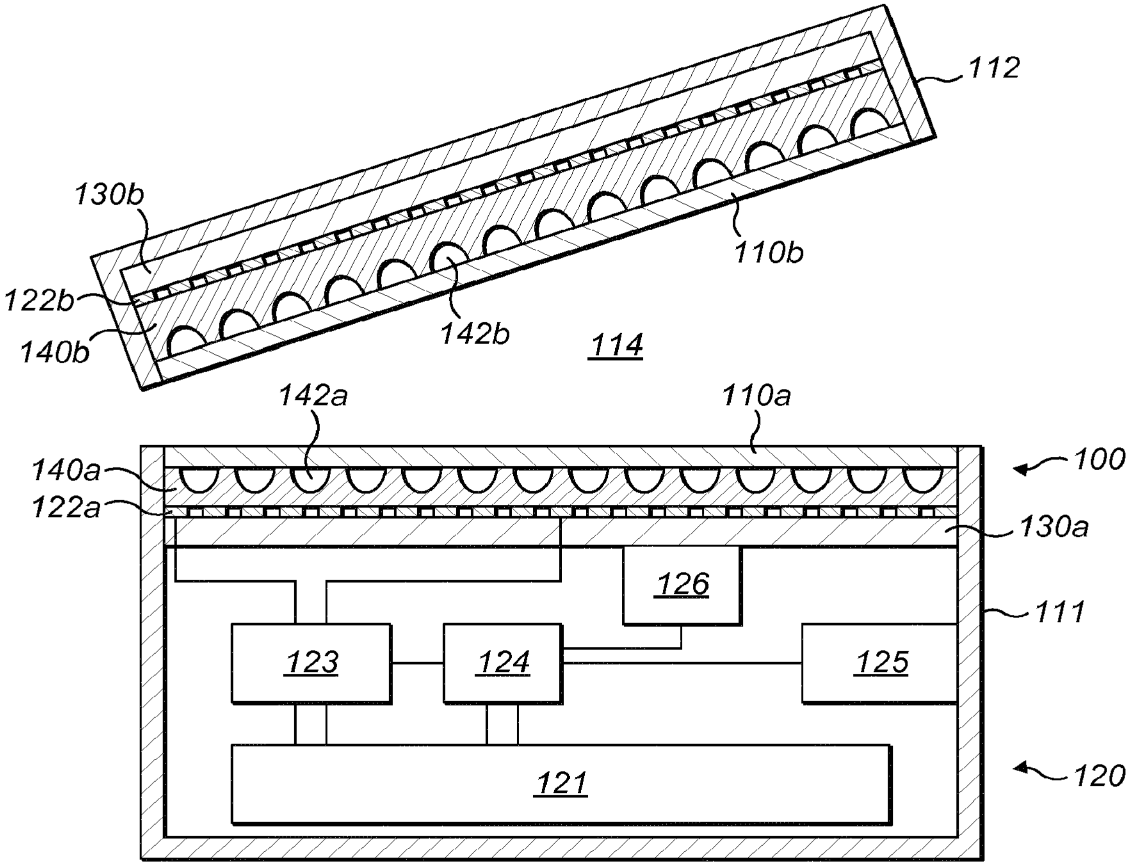
FIG. 6 shows a schematic perspective view of a portion of an example of apparatus for heating smokable material to volatilize at least one component of the smokable material.

Referring to FIG. 6 there is shown a schematic cross-sectional view of an example of apparatus for heating smokable material to volatilize at least one component of the smokable material, according to an embodiment of the disclosure. The apparatus 100 of this embodiment is usable with the articles 1, 2, 3 and variants thereof discussed above with reference to FIGS. 1 to 5. Broadly speaking, the apparatus 100 comprises a first body 111, a second body 112, and a heating zone 114 between the first and second bodies 111, 112 for receiving at least a portion of an article 1, 2, 3 comprising smokable material 10.

The first body 111 is movable relative to the second body 112 to compress the heating zone 114. That is, such movement varies a volume of the heating zone 114. In this embodiment, the first body 111 is rotatable relative to the second body 112. However, in other embodiments the movement could be a translation, a combination of a translation and a rotation, an irregular movement, or the like. In this embodiment, movement of the first body 111 relative to the second body 112 in a first direction reduces the volume of the heating zone 114, whereas movement of the first body 111 relative to the second body 112 in a second direction increases the volume of the heating zone 114.

In some embodiments, when the article 1, 2, 3 is located in the heating zone 114, such movement of the first body 111 relative to the second body 112 compresses the article 1, 2, 3. Such compression of the article 1, 2, 3 may compress the smokable material 10, so as to increase the thermal conductivity of the smokable material 10. In other words, compression of the smokable material 10 can provide for higher heat transfer through the article 1, 2, 3. Such compression should not be so great as to break the article 1, 2, 3 or to prevent a user to be able to draw volatilized material from the article 1, 2, 3.

In this embodiment, the apparatus 100 comprises a magnetic field generator 120, which is for generating varying magnetic fields to be used in heating the smokable material of the article 1, 2, 3 when the article 1, 2, 3 is located in the heating zone 114. In this embodiment, the magnetic field generator 120 comprises an electrical power source 121, two electrically-conductive coils 122*a*, 122*b*, a device 123 for passing a varying electrical current, such as an alternating current, through each of the coils 122*a*, 122*b*, a controller 124, and a user interface 125 for user-operation of the controller 124.

The first body 111 comprises a first coil 122*a* of the two electrically-conductive coils, a first support 130*a* on which the first electrically-conductive coil 122*a* is supported, a first non-electrically-conductive member 140*a* defining one or more air flow channels 142*a*, and a first heater 110*a*. The first member 140*a* is located between the first electrically-conductive coil 122*a* and the first heater 110*a*. Similarly, the second body 112 comprises a second coil 122*b* of the two electrically-conductive coils, a second support 130*b* on which the second electrically-conductive coil 122*b* is supported, a second non-electrically-conductive member 140*b* defining one or more air flow channels 142*b*, and a second heater 110*b*. The second member 140*b* is located between the second electrically-conductive coil 122*b* and the second heater 110*b*. In this embodiment, the first and second heaters 110*a*, 110*b* define the heating zone 114. However, in other embodiments, other parts of the apparatus 100 may instead or additionally define the heating zone 114.

In this embodiment, each of the first and second heaters 110*a*, 110*b* comprises heating material that is heatable by penetration with a varying magnetic field. The heating material may comprise one or more of the heating materials discussed above. More specifically, although not shown in FIG. 6, in this embodiment, each of the first and second heaters 110*a*, 110*b* defines a plurality of closed circuits of heating material. The closed circuits are heatable in use to heat the heating zone 114. It has been found that the use of closed circuits provides enhanced magnetic coupling between the first and second heaters 110*a*, 110*b* and the first and second coils 122*a*, 122*b*, respectively in use, which may in turn provide greater or improved Joule heating of the first and second heaters 110*a*, 110*b*. In some embodiments, one or each of the first and second heaters 110*a*, 110*b* may define only one closed circuit of heating material. In other embodiments, such as those in which each of the first and second heaters 110*a*, 110*b* is made of a magnetic non-electrically conductive material, the first and second heaters 110*a*, 110*b* may not define any number of closed circuits. In some embodiments, one or each of the first and second heaters 110*a*, 110*b* may comprise a plate of heating material or a plurality of discrete regions of heating material.

In some embodiments, an impedance of the coil 122*a* of one of the first and second bodies 111, 112 is equal, or substantially equal, to an impedance of the heater 110*a*, 110*b* of that one of the first and second bodies 111, 112. Matching the impedances may help to balance the voltage and current to maximize the heating power generated at the heaters 110*a*, 110*b* when heated in use.

In this embodiment, the device 123 for passing an alternating or varying electrical current through each of the coils 122*a*, 122*b* is electrically connected between the electrical power source 121 and each of the coils 122*a*, 122*b* (although only the electrical connection with the coil 122*a* of the first body 111 is shown in FIG. 6, for clarity). In this embodiment, the controller 124 also is electrically connected to the electrical power source 121, and is communicatively connected to the device 123. The controller 124 is for causing and controlling heating by the apparatus 100. More specifically, in this embodiment, the controller 124 is for controlling the device 123, so as to control the supply of electrical power from the electrical power source 121 to the coils 122*a*, 122*b*. In this embodiment, the controller 124 comprises an integrated circuit (IC), such as an IC on a printed circuit board (PCB). In other embodiments, the controller 124 may take a different form. In some embodiments, the apparatus may have a single electrical or electronic component comprising the device 123 and the controller 124. The controller 124 is operated in this embodiment by user-operation of the user interface 125. In this embodiment, the user interface 125 is located at the exterior of the apparatus 100. The user interface 125 may comprise a push-button, a toggle switch, a dial, a touchscreen, or the like. In other embodiments, the user interface 125 may be remote and connected to the rest of the apparatus wirelessly, such as via Bluetooth.

In this embodiment, operation of the user interface 125 by a user causes the controller 124 to cause the device 123 to apply an alternating electric current across each of the coils 122*a*, 122*b*, so as to cause the coils 122*a*, 122*b* to generate respective alternating magnetic fields. The first coil 122*a* and the first heater 110*a* are suitably relatively positioned so that the alternating magnetic field produced by the first coil 122*a* penetrates the first heater 110*a*. When the heating material of the first heater 110*a* is an electrically-conductive material, this may cause the generation of one or more eddy currents in the first heater 110*a*. The flow of eddy currents in the first heater 110*a* against the electrical resistance of the first heater 110*a* causes the first heater 110*a* to be heated by Joule heating. As mentioned above, when the first heater 110*a* is made of a magnetic material, the orientation of magnetic dipoles in the first heater 110*a* changes with the changing applied magnetic field, which causes heat to be generated in the first heater 110*a*. Similarly, in this embodiment, the second coil 122*b* and the second heater 110*b* are suitably relatively positioned so that the alternating magnetic field produced by the second coil 122*b* penetrates the second heater 110*b*.

In some embodiments, one or both of the first and second heaters 110*a*, 110*b* comprising heating material may be omitted from the apparatus 100. In such embodiments, the apparatus 100 still comprises a magnetic field generator for generating a varying magnetic field. Such apparatus 100 may be usable with an article, such as one of articles 1, 2, 3 and variants thereof discussed above with reference to FIGS. 1 to 5, which itself comprises heating material that can act in use as a heater to heat the smokable material 10 therein. In such embodiments, the heating zone 114 would be defined by other parts of the first and second bodies 111, 112. In such embodiments, the heating zone 114 and the coils 122*a*, 122*b* may be relatively positioned so that the varying magnetic fields produced by the coils 122*a*, 122*b* in use penetrate the heating zone 114 at location(s) where the heating material of the article 1, 2, 3 would be located when the article 1, 2, 3 is located in the heating zone 114. When the heating material of the article 1, 2, 3 is an electrically-conductive material, this may cause the generation of eddy currents in the heating material of the article 1, 2, 3. The flow of such eddy currents against the electrical resistance of the heating material causes the heating material to be heated by Joule heating. When the heating material of the article 1, 2, 3 is made of a magnetic material, the orientation of magnetic dipoles in the heating material changes with the changing applied magnetic field, which causes heat to be generated in the heating material.

In some embodiments, the heating material of the heater(s) 110*a*, 110*b* of the apparatus 100 or the heating material of the article 1, 2, 3 may comprise discontinuities or holes therein. Such discontinuities or holes may act as thermal breaks to control the degree to which different regions of the smokable material are heated in use. Areas of the heating material with discontinuities or holes therein may be heated to a lesser extent that areas without discontinuities or holes. This may help progressive heating of the smokable material, and thus progressive generation of vapor, to be achieved.

Figure 7:
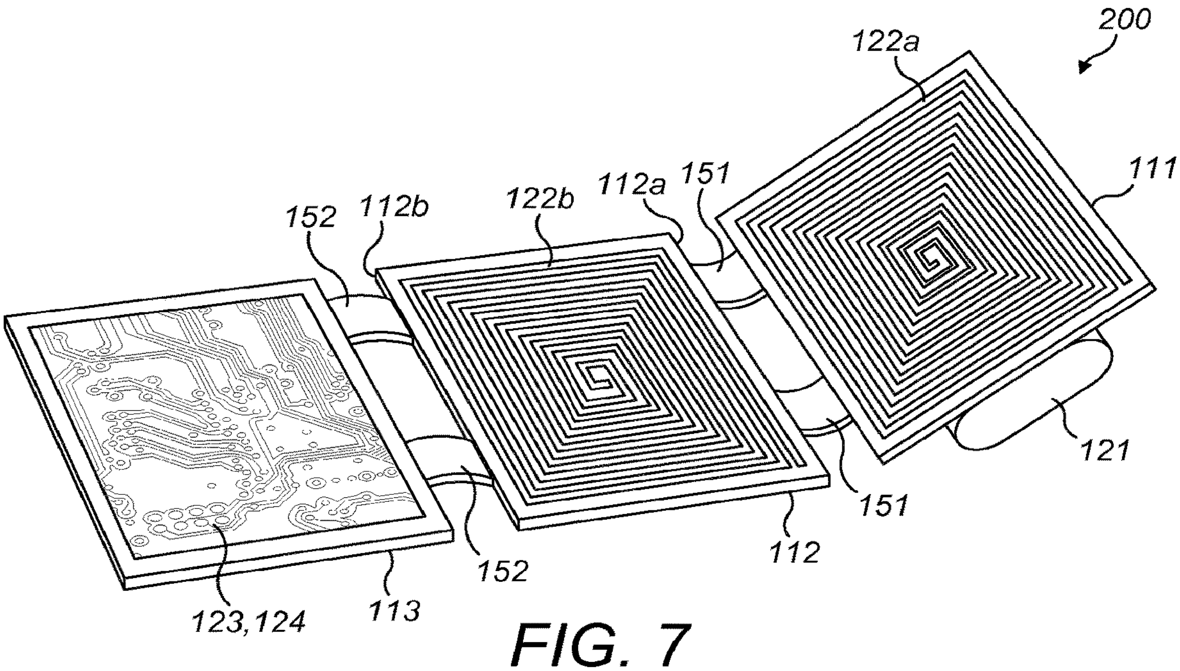
FIG. 7 shows a schematic perspective view of a portion of an example of another apparatus for heating smokable material to volatilize at least one component of the smokable material in a partially disassembled state.
Figure 8:
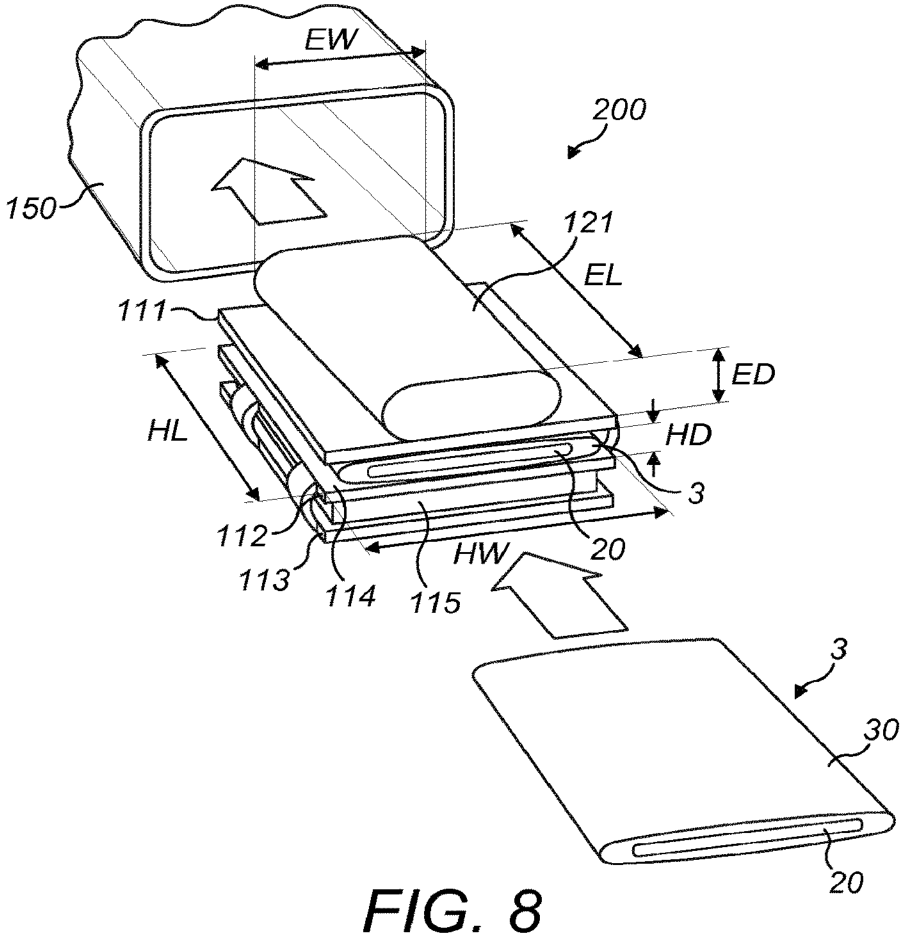
FIG. 8 shows a schematic perspective view of a portion of the apparatus of FIG. 7 in a partially disassembled state.

Referring to FIGS. 7 and 8 there are shown schematic perspective views of respective portions of an example of apparatus for heating smokable material to volatilize at least one component of the smokable material, according to another embodiment of the disclosure. The apparatus 200 of this embodiment is usable with the articles 1, 2, 3 and variants thereof discussed above with reference to FIGS. 1 to 5. Broadly speaking, the apparatus 200 comprises a heating zone 114 for receiving at least a portion of an article 1, 2, 3 comprising smokable material 10, and a magnetic field generator 120 for generating a varying magnetic field to be used in heating the smokable material 10 when the portion of the article 1, 2, 3 is located in the heating zone 114. In FIG. 8, the article 3 of FIG. 5 is shown being inserted into the heating zone 114 of the apparatus 200. However, in other embodiments, a different article, such as one of the articles 1, 2 shown in FIGS. 1 to 4, may be used with the apparatus 200.

The heating zone 114 of the apparatus 200 has a length HL, a width HW perpendicular to the length HL, and a depth HD perpendicular to each of the length HL and the width HW. In this embodiment, the length HL is greater than the width HW, and the width HW is greater than the depth HD, so that the heating one 114 is elongate. However, in other embodiments, the length HL may be equal or substantially equal to the width HW, so that the heating zone 114 is not elongate as such. In any event, by providing that the heating zone 114 is similarly sized and proportioned relative to the article 1, 2, 3 with which the apparatus 200 is to be used, a close or snug fit may be provided between the article 1, 2, 3 and the apparatus 200. This may help to protect the article 1, 2, 3 from being damaged by movement relative to the apparatus 200 if the apparatus 200 is knocked. It may also help to ensure that the article 1, 2, 3, and thus the heating material of the article 1, 2, 3, is well-placed relative to the magnetic field generator 120.

In this embodiment, as best shown in FIG. 7, the apparatus 200 comprises first, second and third bodies 111, 112, 113. A first side 112*a* of the second body 112 is attached to the first body 111 via a pair of first elements 151. A second side 112*b* of the second body 112 is attached to the third body 113 via a pair of second elements 152. Accordingly, the second body 112 is between the first and third bodies 111, 113. In other embodiments, only one of each of the first and second elements 151, 152 may be provided. In this embodiment, the first and second elements 151, 152 are flexible and so the first, second and third bodies 111, 112, 113 are moveable relative to one another due to the flexible nature of the elements 151, 152 connecting them together. The first and second elements 151, 152 are foldable to effect rotation of the second body 112 relative to each of the first and third bodies 111, 113. In this embodiment, the first and third bodies 111, 113 are movable relative to the second body 112 so that the second body 112 becomes sandwiched between the first and third bodies 111, 113, as shown in FIG. 8. In this embodiment, in such a state, the first to third bodies 111, 112, 113 are substantially parallel to one another. In other embodiments, the first and second elements 151, 152 may be distortable and other than flexible. For example, in some embodiments, each of the first and second elements 151, 152 may comprise a hinge. In some embodiments, each of the first and second elements 151, 152 may be relatively non-distortable.

In this embodiment, the magnetic field generator 120 comprises an electrical power source 121, two electrically-conductive coils 122*a*, 122*b*, a device 123 for passing a varying electrical current, such as an alternating current, through each of the coils 122*a*, 122*b*, a controller 124, and a user interface (not shown) for user-operation of the controller 124.

In this embodiment, each of the first and second bodies 111, 112 comprises a respective one of the electrically-conductive coils 122*a*, 122*b*. In this embodiment, each of the coils 122*a*, 122*b* is a two-dimensional electrically-conductive coil, but in other embodiments one or each of the coils 122*a*, 122*b* could take a different form.

In this embodiment, the third body 113 comprises the device 123 and the controller 124. The device 123 and the controller 124 may take any of the forms discussed above for the device 123 and the controller 124 of the apparatus 100 of FIG. 6. The third body may comprise at least a portion of an electrical circuit, which electrical circuit may be part of the device 123 and/or part of the controller 124.

Similarly to the embodiment of FIG. 6, in this embodiment the device 123 for passing an alternating or varying electrical current through each of the coils 122*a*, 122*b* is electrically connected between the electrical power source 121 and each of the coils 122*a*, 122*b*. Moreover, the controller 124 also is electrically connected to the electrical power source 121, and is communicatively connected to the device 123. The electrical connections between the components of the magnetic field generator 120 on the first to third bodies 111, 112, 113 may be via one or more of the first and second elements 151, 152. The controller 124 is for causing and controlling heating by the apparatus 200. The controller 124 may take any of the forms discussed above for the controller 124 of the apparatus 100 of FIG. 6. In some embodiments, the apparatus 200 may have a single electrical or electronic component comprising the device 123 and the controller 124. The user interface may take any of the forms discussed above for the user interface 125 of the apparatus 100 of FIG. 6.

In this embodiment, the heating zone 114 is defined by and is arranged between the first and second bodies 111, 112 when the apparatus 200 is in the state shown in FIG. 8. In this embodiment, thermal insulation 115 is located between the second and third bodies 112, 113 when the apparatus 200 is in the state shown in FIG. 8. The thermal insulation 115 may comprise one or more materials selected from the group consisting of: aerogel, vacuum insulation, wadding, fleece, non-woven material, non-woven fleece, woven material, knitted material, nylon, foam, polystyrene, polyester, polyester filament, polypropylene, a blend of polyester and polypropylene, cellulose acetate, paper or card, and corrugated material such as corrugated paper or card. The thermal insulation 115 may additionally or alternatively comprise an air gap. Such thermal insulation 115 can help prevent heat loss from the heating zone 114 to electrical components of the apparatus 200, such as the device 123 and/or the controller 124, and provide more efficient heating of the smokable material 10 within the heating zone 114. In some embodiments, the thermal insulation 115 may be omitted.

In this embodiment, all of the components discussed above of the apparatus 200 are packaged in an outer housing 150 of the apparatus 200, so as to maintain the relative relationship of all the components.

In this embodiment, the electrical power source 121 is offset from the heating zone 114 in a direction parallel to the depth HD of the heating zone 114. This can allow the exterior dimensions of the housing 150 or apparatus 200 to be relatively compact, as compared to an alternative construction in which the electrical power source 121 is offset from the heating zone 114 in a direction parallel to the length HL or width HW of the heating zone 114. In this embodiment, the electrical power source 121 has a length EL, a width EW perpendicular to the length EL, and a depth ED perpendicular to each of the length EL and the width EW. The length EL is greater than the width EW, and the width EW is greater than the depth ED. Furthermore, the length EL, width EW and depth ED of the electrical power source 121 are substantially parallel to the length HL, width HW and depth HD, respectively, of the heating zone 114. Accordingly, the exterior dimensions of the housing 150 or apparatus 200 can be further compact, as compared to an alternative construction in which the electrical power source 121 is proportioned differently relative to the heating zone 114. However, in other embodiments, the electrical power source 121 may take a different form to that illustrated, and/or may be located elsewhere to the location illustrated.

In some embodiments, the third body 113 may be omitted. In some such embodiments, the device 123 and the controller 124 would be located elsewhere in the apparatus 200, such as on the major surface of the second body 112 opposite from the major surface that carries the second coil 122*b*.

In this embodiment, the heating zone 114 and the coils 122*a*, 122*b* are relatively positioned so that the varying magnetic fields produced by the coils 122*a*, 122*b* in use penetrate the heating zone 114 at location(s) where the heating material of the article 1, 2, 3 would be located, when the article 1, 2, 3 is located in the heating zone 114. When the heating material of the article 1, 2, 3 is an electrically-conductive material, this may cause the generation of eddy currents in the heating material of the article 1, 2, 3. The flow of such eddy currents against the electrical resistance of the heating material causes the heating material to be heated by Joule heating. When the heating material of the article 1, 2, 3 is made of a magnetic material, the orientation of magnetic dipoles in the heating material changes with the changing applied magnetic field, which causes heat to be generated in the heating material.

In each of the embodiments discussed above, each of the coils 122*a*, 122*b* may take any suitable form. In the illustrated embodiments, each of the coils 122*a*, 122*b* comprises a two-dimensional spiral of electrically-conductive material, such as copper. In some embodiments, the magnetic field generator 120 may comprise one or more magnetically permeable cores around which the coils 122*a*, 122*b* are respectively wound. This can help concentrate the magnetic flux produced by the respective coils 122*a*, 122*b* to make more powerful magnetic fields. The, or each, magnetically permeable core may be made of iron, for example. In some embodiments, the magnetically permeable core may extend only partially along the length of its associated coil 122*a*, 122*b*, so as to concentrate the magnetic flux only in certain regions.

Although, in each of the embodiments discussed above, each of the first and second bodies 111, 112 comprises an electrically-conductive coil 122*a*, 122*b* of the magnetic field generator 120, in other embodiments, only one of the first and second bodies 111, 112 may comprise such a coil 122*a*, 112*b*. In some embodiments, the magnetic field generator 120 may comprise only one coil 122*a*, 122*b*.

In each of the embodiments discussed above, the electrical power source 121 is a rechargeable battery. In other embodiments, the electrical power source 121 may be other than a rechargeable battery, such as a non-rechargeable battery, a capacitor, a battery-capacitor hybrid, or a connection to a mains electricity supply.

In each of the embodiments discussed above, the apparatus 100, 200 includes a temperature sensor 126 for sensing a temperature of the heating zone 114. The temperature sensor 126 is communicatively connected to the controller 124, so that the controller 124 is able to monitor the temperature of the heating zone 114. In some embodiments, the temperature sensor 126 may be arranged to take an optical temperature measurement of the heating zone 114 or article 1, 2, 3. In some embodiments, the article 1, 2, 3 may comprise a temperature detector, such as a resistance temperature detector (RTD), for detecting a temperature of the article 1, 2, 3. The article 1, 2, 3 may further comprise one or more terminals connected, such as electrically-connected, to the temperature detector. The terminal(s) may be for making connection, such as electrical connection, with a temperature monitor of the apparatus 100 when the article 1, 2, 3 is in the heating zone 114. The controller 124 may comprise the temperature monitor. The temperature monitor of the apparatus 100 may thus be able to determine a temperature of the article 1, 2, 3 during use of the article 1, 2, 3 with the apparatus 100.

In some embodiments, by providing that the heating material of the article 1, 2, 3 has a suitable resistance, the response of the heating material to a change in temperature could be sufficient to give information regarding temperature inside the article 1, 2, 3. The temperature sensor of the apparatus 100 may then comprise a probe for analyzing the heating material of the article 1, 2, 3.

In some embodiments, the temperature sensor 126 of the apparatus 100, 200 may be for contacting the heating material of the article when the article is located in the heating zone 114. For example, in some embodiments, the temperature sensor 126 of the apparatus 100, 200 may comprise a thermocouple that contacts the protruding portion of the substrate 20 of the article 3 of FIG. 5. The thermocouple may be biased into contact with the article by a resilient element, such as a leaf spring.

In each of the embodiments discussed above, on the basis of one or more signals received from the temperature sensor 126 or temperature detector, the controller 124 may cause the device 123 to adjust a characteristic of the varying or alternating current passed through the first coil 122*a* and/or the second coil 122*b* as necessary, in order to ensure that the temperature of the heating zone 114 remains within a predetermined temperature range. The characteristic may be, for example, amplitude or frequency. Within the predetermined temperature range, in use the smokable material 10 of the article 1, 2, 3 located in the heating zone 114 in use is heated sufficiently to volatilize at least one component of the smokable material 10 without combusting the smokable material 10. Accordingly, the controller 124, and the apparatus 100, 200 as a whole, is arranged to heat the smokable material 10 to volatilize the at least one component of the smokable material 10 without combusting the smokable material 10. In some embodiments, the temperature range is about 50° C. to about 300° C., such as between about 50° C. and about 250° C., between about 50° C. and about 150° C., between about 50° C. and about 120° C., between about 50° C. and about 100° C., between about 50° C. and about 80° C., or between about 60° C. and about 70° C. In some embodiments, the temperature range is between about 170° C. and about 220° C. In other embodiments, the temperature range may be other than this range. In some embodiments, the temperature sensor 126 may be omitted.

In some embodiments, the apparatus 100, 200 or the article 1, 2, 3 may comprise a mouthpiece. In such embodiments, when the article 1, 2, 3 is located in the heating zone 114, a user may be able to inhale the volatilized component(s) of the smokable material 10 by drawing the volatilized component(s) through a channel in the mouthpiece that is in fluid communication with the heating zone 114. In the apparatus 100 of FIG. 6, as the volatilized component(s) are removed from the article 1, 2, 3, air may be drawn into the heating zone 114 from the exterior of the apparatus 100 via the air flow channels 142*a*, 142*b*. This air may then permeate the article 1, 2, 3 and exit the heating zone 114 via the channel of the mouthpiece when the user takes another draw. Such passage of air through the air flow channels 142*a*, 142*b* may help to remove heat generated by the first and second heaters 110*a*, 100*b* away from the first and second coils 122*a*, 122*b* and the rest of the magnetic field generator 120. In other embodiments, the air flow channels 142*a*, 142*b* may be omitted, and air may be drawn into the heating zone 114 via a different path.

The apparatus 100, 200 may provide haptic feedback to a user. The feedback could indicate that heating is taking place, or be triggered by a timer to indicate that greater than a predetermined proportion of the original quantity of volatilizable component(s) of the smokable material 10 in the article 1, 2, 3 has/have been spent, or the like. The haptic feedback could be created by interaction of heating material with one or both of the coils 122*a*, 122*b* (i.e. magnetic response), by interaction of an electrically-conductive element with one or both of the coils 122*a*, 122*b*, by rotating an unbalanced motor, by repeatedly applying and removing a current across a piezoelectric element, or the like.

In embodiments in which the apparatus 100, 200 comprises more than one coil 122*a*, 122*b*, such as that illustrated, the plurality of coils 122*a*, 122*b* could be operated to provide progressive heating of the smokable material 10 in an article 1, 2, 3, and thereby progressive generation of vapor. For example, one coil 122*a* may be able to heat a first region of the heating material relatively quickly to initialize volatilization of at least one component of the smokable material 10 and formation of vapor in a first region of the smokable material 10. Another coil 122*b* may be able to heat a second region of the heating material relatively slowly to initialize volatilization of at least one component of the smokable material 10 and formation of vapor in a second region of the smokable material 10. Accordingly, vapor is able to be formed relatively rapidly for inhalation by a user, and vapor can continue to be formed thereafter for subsequent inhalation by the user even after the first region of the smokable material 10 may have ceased generating vapor. The initially-unheated second region of smokable material 10 could act as a heat sink, to reduce the temperature of created vapor or make the created vapor mild, during heating of the first region of smokable material 10.

The heating material used in embodiments of the disclosure may have a skin depth, which is an exterior zone within which most of an induced electrical current and/or induced reorientation of magnetic dipoles occurs. By providing that the component comprising the heating material has a relatively small thickness, a greater proportion of the heating material may be heatable by a given varying magnetic field, as compared to heating material in a component having a depth or thickness that is relatively large as compared to the other dimensions of the component. Thus, a more efficient use of material is achieved. In turn, costs are reduced.

In some embodiments, the heating material may comprise discontinuities or holes therein. Such discontinuities or holes may act as thermal breaks to control the degree to which different regions of the smokable material 10 are heated in use. Areas of the heating material with discontinuities or holes therein may be heated to a lesser extent that areas without discontinuities or holes. This may help progressive heating of the smokable material 10, and thus progressive generation of vapor, to be achieved. Such discontinuities or holes may, on the other hand, be used to optimize the creation of complex eddy currents in use.

In each of the above described embodiments, the smokable material 10 comprises tobacco. However, in respective variations to each of these embodiments, the smokable material 10 may consist of tobacco, may consist substantially entirely of tobacco, may comprise tobacco and smokable material other than tobacco, may comprise smokable material other than tobacco, or may be free of tobacco. In some embodiments, the smokable material 10 may comprise a vapor or aerosol forming agent or a humectant, such as glycerol, propylene glycol, triacetin, or diethylene glycol.

An article embodying the present disclosure may be a cartridge, for example.

In each of the above described embodiments, the article 1, 2, 3 is a consumable article. Once all, or substantially all, of the volatilizable component(s) of the smokable material 10 in the article 1, 2, 3 has/have been spent, the user may remove the article 1, 2, 3 from the apparatus and dispose of the article 1, 2, 3. The user may subsequently re-use the apparatus with another of the articles 1, 2, 3. However, in other respective embodiments, the article 1, 2, 3 may be non-consumable, and the apparatus and the article 1, 2, 3 may be disposed of together once the volatilizable component(s) of the smokable material 10 has/have been spent.

In some embodiments, the apparatus discussed above is sold, supplied or otherwise provided separately from the articles 1, 2, 3 with which the apparatus is usable. However, in some embodiments, the apparatus and one or more of the articles 1, 2, 3 may be provided together as a system, such as a kit or an assembly, possibly with additional components, such as cleaning utensils.

Embodiments of the disclosure could be implemented in a system comprising any one of the articles discussed herein, and any one of the apparatuses discussed herein, wherein the apparatus itself has heating material, such as in a susceptor, for heating by penetration with the varying magnetic field generated by the magnetic field generator. Heat generated in the heating material of the apparatus could be transferred to the article to heat, or further heat, the smokable material therein. In some such embodiments, the article may be free of heating material, so that the smokable material of the article is heated only by the heat transferred to the article from the heating material of the apparatus.

In order to address various issues and advance the art, the entirety of this disclosure shows by way of illustration and example various embodiments in which the claimed invention may be practiced and which provide for superior apparatus for heating smokable material to volatilize at least one component of the smokable material, superior articles for use with such apparatus, and superior systems comprising such apparatus and such articles. The advantages and features of the disclosure are of a representative sample of embodiments only, and are not exhaustive and/or exclusive. They are presented only to assist in understanding and teach the claimed and otherwise disclosed features. It is to be understood that advantages, embodiments, examples, functions, features, structures and/or other aspects of the disclosure are not to be considered limitations on the disclosure as defined by the claims or limitations on equivalents to the claims, and that other embodiments may be utilized and modifications may be made without departing from the scope and/or spirit of the disclosure. Various embodiments may suitably comprise, consist of, or consist in essence of, various combinations of the disclosed elements, components, features, parts, steps, means, etc. The disclosure may include other inventions not presently claimed, but which may be claimed in future.

We claim:

1. A system comprising an apparatus for heating smokable material to volatilize at least one component of the smokable material and an article for use therewith, the apparatus comprising:

a heating zone for receiving at least a portion of the article comprising smokable material, wherein the heating zone has a length, a width perpendicular to the length, and a depth perpendicular to each of the length and the width, wherein the length is greater than or equal to the width, and wherein the width is greater than the depth; and a magnetic field generator for generating a varying magnetic field to be used in heating the smokable material when the portion of the article is located in the heating zone; and a first body and a second body, wherein the heating zone is defined by and is arranged between the first body and the second body such that the depth of the heating zone is the distance between the first body and the second body, and wherein at least one of the first body or the second body comprises at least a portion or a magnetic field generator for generating a varying magnetic field to be used in heating the smokable material when the portion of the article is located in the heating zone, the article comprising:

a mass of smokable material;

and wherein an exterior of the article has a length, a width perpendicular to the length, and a depth perpendicular to each of the length and the width, wherein the length is greater than or equal to the width, and wherein the width is greater than the depth, wherein the article comprises a substrate, and wherein the mass of smokable material is on the substrate, and wherein, in use, all of the smokable material on the substrate is within the heating zone.

2. The system of claim 1, wherein the magnetic field generator comprises an electrical power source that is offset from the heating zone in a direction parallel to the depth of the heating zone.

3. The system of claim 1, wherein the portion of a magnetic field generator comprises a two-dimensional electrically-conductive coil.

* * * * *